United States Patent
Pelletier et al.

(10) Patent No.: US 11,678,321 B2
(45) Date of Patent: Jun. 13, 2023

(54) FLOW-BASED PROCESSING IN WIRELESS SYSTEMS

(71) Applicant: IDAC Holdings, Inc., Wilmington, DE (US)

(72) Inventors: Ghyslain Pelletier, Montreal (CA); Diana Pani, Montreal (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/092,407

(22) Filed: Nov. 9, 2020

(65) Prior Publication Data

US 2021/0058951 A1     Feb. 25, 2021

Related U.S. Application Data

(63) Continuation of application No. 16/300,259, filed as application No. PCT/US2017/032409 on May 12, 2017, now abandoned.

(Continued)

(51) Int. Cl.
*H04W 72/12*  (2009.01)
*H04W 76/18*  (2018.01)
(Continued)

(52) U.S. Cl.
CPC ....... *H04W 72/1268* (2013.01); *H04L 1/1812* (2013.01); *H04W 24/08* (2013.01);
(Continued)

(58) Field of Classification Search
None
See application file for complete search history.

(56) References Cited

U.S. PATENT DOCUMENTS 10,608,792 B2    3/2020 Pani et al.
10,893,530 B2 *  1/2021 Uchino ............ H04W 28/0263
(Continued)

FOREIGN PATENT DOCUMENTS

CN    101964996 A    2/2011
CN    102882640 A    1/2013
(Continued)

OTHER PUBLICATIONS

De Coninck et al., "Observing Real Smartphone Applications over Multipath TCP", IEEE Communications Magazine: Network Testing Series, vol. 54, No. 3, Mar. 2016, 7 pages.

(Continued)

*Primary Examiner* — Eunsook Choi
(74) *Attorney, Agent, or Firm* — Majid Albassam

(57) ABSTRACT

The WTRU may determine that one or more data units correspond to a flow of such data units. The WTRU may perform such determination as a function of one or more matching rule(s). Flow-based processing may be enabled in the layer 2/layer 1 chain by per-packet determination using one or more rules, for example by routing through the applicable processing functions and/or using the applicable configuration and/or mapping to the applicable uplink physical layer functions and/or resources. One or more functions such as scheduling request, buffer status reporting, HARQ processing, and/or radio link failure and recovery may be controlled based on the policy associated with the flow corresponding to the data being processed.

24 Claims, 13 Drawing Sheets

Related U.S. Application Data

(60) Provisional application No. 62/474,940, filed on Mar. 22, 2017, provisional application No. 62/373,251, filed on Aug. 10, 2016, provisional application No. 62/335,627, filed on May 12, 2016.

(51) Int. Cl.
　　*H04W 72/1268*　　(2023.01)
　　*H04W 72/566*　　(2023.01)
　　*H04L 1/1812*　　(2023.01)
　　*H04W 24/08*　　(2009.01)
　　*H04W 28/02*　　(2009.01)
　　*H04W 72/0453*　　(2023.01)
　　*H04W 80/02*　　(2009.01)
　　*H04W 92/10*　　(2009.01)

(52) U.S. Cl.
　　CPC ... *H04W 28/0278* (2013.01); *H04W 72/0453* (2013.01); *H04W 72/566* (2023.01); *H04W 76/18* (2018.02); *H04W 80/02* (2013.01); *H04W 92/10* (2013.01)

(56) References Cited

U.S. PATENT DOCUMENTS

| | | | |
|---|---|---|---|
| 2002/0181436 A1* | 12/2002 | Mueckenheim | H04L 1/1812 370/349 |
| 2004/0185892 A1* | 9/2004 | Iacono | H04W 28/065 455/522 |
| 2008/0123660 A1 | 5/2008 | Sammour et al. | |
| 2009/0003290 A1 | 1/2009 | Lee | |
| 2010/0202394 A1 | 8/2010 | Zhang et al. | |
| 2011/0038333 A1* | 2/2011 | Yi | H04W 72/0413 370/329 |
| 2011/0310851 A1* | 12/2011 | Klingenbrunn | H04W 76/22 370/332 |
| 2013/0132604 A1 | 5/2013 | Cohen et al. | |
| 2014/0286266 A1 | 9/2014 | Sammour et al. | |
| 2015/0139080 A1* | 5/2015 | Ellenbeck | H04L 1/00 370/329 |
| 2015/0264706 A1* | 9/2015 | Voigt | H04W 72/1263 370/329 |
| 2015/0373689 A1 | 12/2015 | Tabet et al. | |
| 2016/0050682 A1* | 2/2016 | Uchino | H04W 72/10 370/235 |
| 2017/0290008 A1* | 10/2017 | Tooher | H04L 1/1893 |
| 2018/0124633 A1* | 5/2018 | Hwang | H04W 28/02 |
| 2018/0152939 A1* | 5/2018 | Lee | H04W 72/542 |
| 2019/0124674 A1* | 4/2019 | Lee | H04W 72/02 |
| 2019/0174554 A1* | 6/2019 | Deenoo | H04W 76/27 |
| 2021/0068004 A1* | 3/2021 | Kadiri | H04W 28/0268 |

FOREIGN PATENT DOCUMENTS

| | | |
|---|---|---|
| JP | 2012517743 A | 8/2012 |
| JP | 2014204334 A | 10/2014 |
| JP | 2016010152 A | 1/2016 |
| WO | WO 2007092245 A2 | 8/2007 |
| WO | WO 2015188875 A1 | 12/2015 |
| WO | WO 2016015350 A1 | 2/2016 |

OTHER PUBLICATIONS

Motorola, "Bucket Parameter Update", 3GPP Tdoc R2-090423; 3GPP TSG-RAN2 Meeting #64bis; Ljubljana, Slovenia, Jan. 12-16, 2009, 3 pages.

Chen et al., "Effective Capacity-based Delay Performance Estimators for LTE Radio Bearer QoS Provision", 2014 9th International Syposium on Communication Systems, Networks & Digital Sign (CSNDSP), IEEE, Manchester, 2014, pp. 105-110.

\* cited by examiner

FLOW-BASED PROCESSING IN WIRELESS SYSTEMS

CROSS-REFERENCE TO RELATED APPLICATIONS

This application is a continuation of U.S. patent application Ser. No. 16/300,259 filed Nov. 9, 2018, which is a National Stage Application filed under 35 U.S.C. 371 of International Application No. PCT/US2017/032409, filed May 12, 2017 and claims the benefit of U.S. Provisional Patent Application No. 62/474,940 filed on Mar. 22, 2017; U.S. Provisional Patent Application No. 62/373,251, filed on Aug. 10, 2016; and U.S. Provisional Patent Application No. 62/335,627, filed on May 12, 2016, the contents of all of which being hereby incorporated by reference as if fully set-forth herein in their respective entirety, for all purposes.

BACKGROUND

Mobile communications are in continuous evolution and are already at the doorstep of their fifth incarnation—5G. As with previous generations, new use cases largely contributed in setting the requirements for the new system. It is expected that the 5G air interface may enable improved broadband performance (IBB), industrial control and communications (ICC), vehicular applications (V2X), and/or massive machine-type communications (mMTC).

Deployments of a 5G network may include stand-alone systems, and/or may include a phased approach, e.g., in combination with existing deployments and/or with existing technologies (such as LTE and/or an evolution thereof). Combinations with existing technologies may involve radio access network components and/or core network components.

SUMMARY

A WTRU may have traffic associated with different QoS requirements. A WTRU may have access to resources (and/or different set thereof), processing functions (and/or chains thereof) that may offer (and/or exhibit) different service characteristics from the perspective of QoS enforcement and/or guarantees. The WTRU may determine how to associate data units with such resources and/or processing functions.

Flow-based processing may be enabled in the layer 2/layer 1 chain by per-packet determination using rules, routing through the applicable processing functions using the applicable configuration and/or mapping to the applicable uplink physical layer functions and/or resources. One or more functional aspects such as scheduling request, buffer status reporting, HARQ processing, and/or radio link failure and recovery may be controlled based on the policy associated with the flow corresponding to the data being processed.

A wireless transmit/receive unit (WTRU) may be in communication with a communication network. The WTRU may comprise a memory. The WTRU may comprise a processor. The processor may be configured to determine to send one or more uplink (UL) transmissions. The processor may be configured to determine a first Transmission Time Interval (TTI) duration for the one or more UL transmissions. The processor may be configured to determine one or more transport blocks (TBs) associated with the first TTI duration. The processor may be configured to determine one or more logical channels associated with the first TTI duration. The one or more logical channels associated with the first TTI duration may have a respective priority. The processor may be configured to determine one or more first data units for the one or more UL transmissions for association with the one or more TBs associated with the first TTI duration, based at least in part on the respective priority of the one or more logical channels associated with the first TTI duration. The WTRU may comprise a transceiver. The transceiver may be configured to send one or more UL transmissions using at least the one or more TBs associated with the first TTI duration to a node of the communication network.

A wireless transmit/receive unit (WTRU) may be in communication with a communication network. The WTRU may comprise a memory. The WTRU may comprise a processor. The processor may be configured to determine one or more data units for a transmission. The processor may be configured to determine a radio link monitoring (RLM) rule, or a radio link failure (RLF) rule, based on the one or more data units. The processor may be configured to monitor a control channel for at least one RLF indication according to the RLM rule, or the RLF rule. The processor may be configured to detect the at least one RLF indication on the control channel based on the RLM rule, or the RLF rule. The processor may be configured to initiate a recovery rule based on the one or more data units upon the detection of the at least one RLF indication.

DETAILED DESCRIPTION

A detailed description of illustrative embodiments will now be described with reference to the various figures. Although this description provides a detailed example of possible implementations, it should be noted that the details are intended to be examples and in no way limit the scope of the application. Unless otherwise noted herein, the articles "a" and/or "an" may be understood as "one or more", or the like.

Figure 1A:
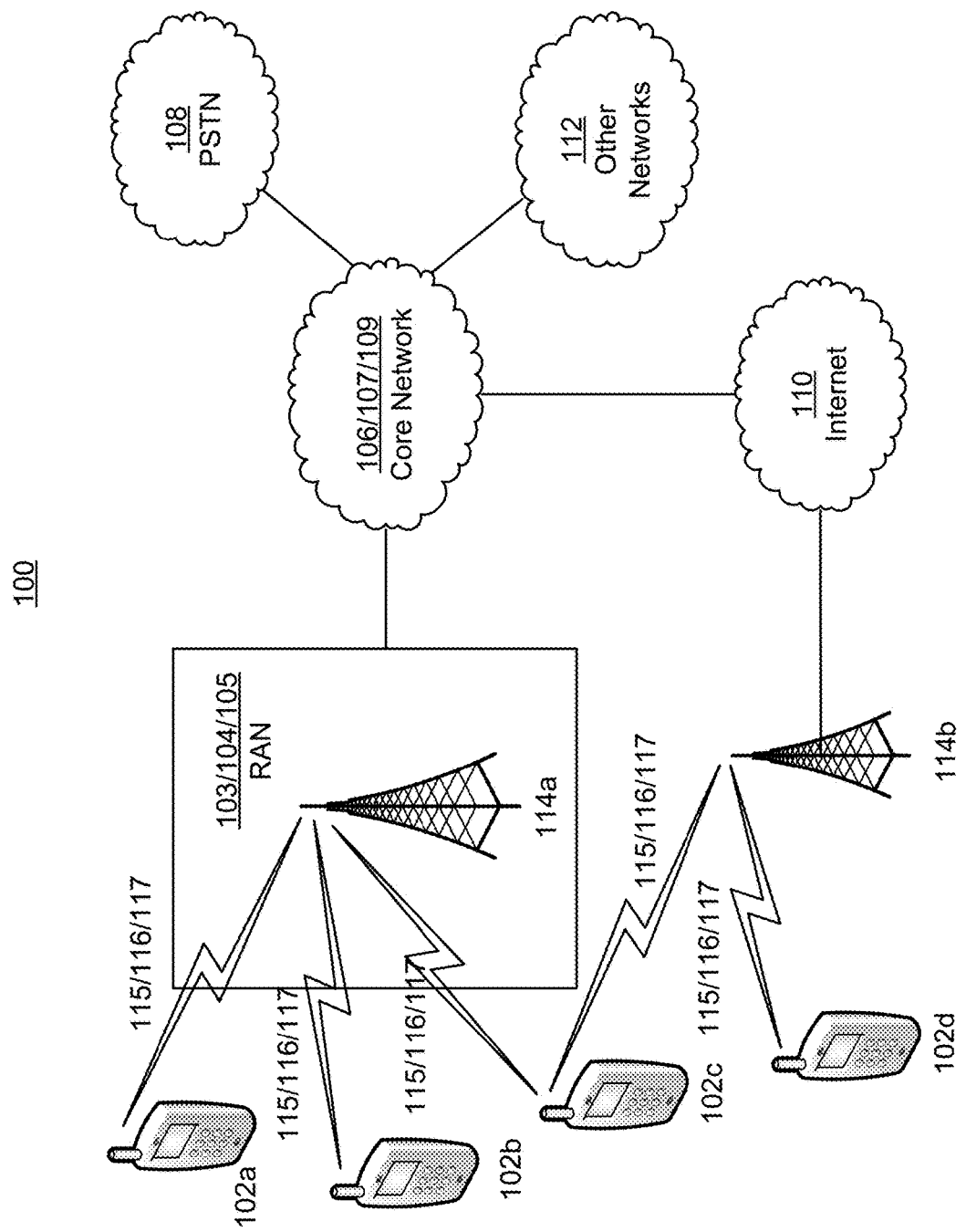
FIG. 1A is a system diagram of an example communications system.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and/or the like. The terms UE and WTRU may be used interchangeably herein.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and/or the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA).

WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and/or the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1a may be configured to communicate with the base station 114a, which may employ a cellular-based radio technology, and with the base station 114b, which may employ an IEEE 802 radio technology.

Figure 1B:
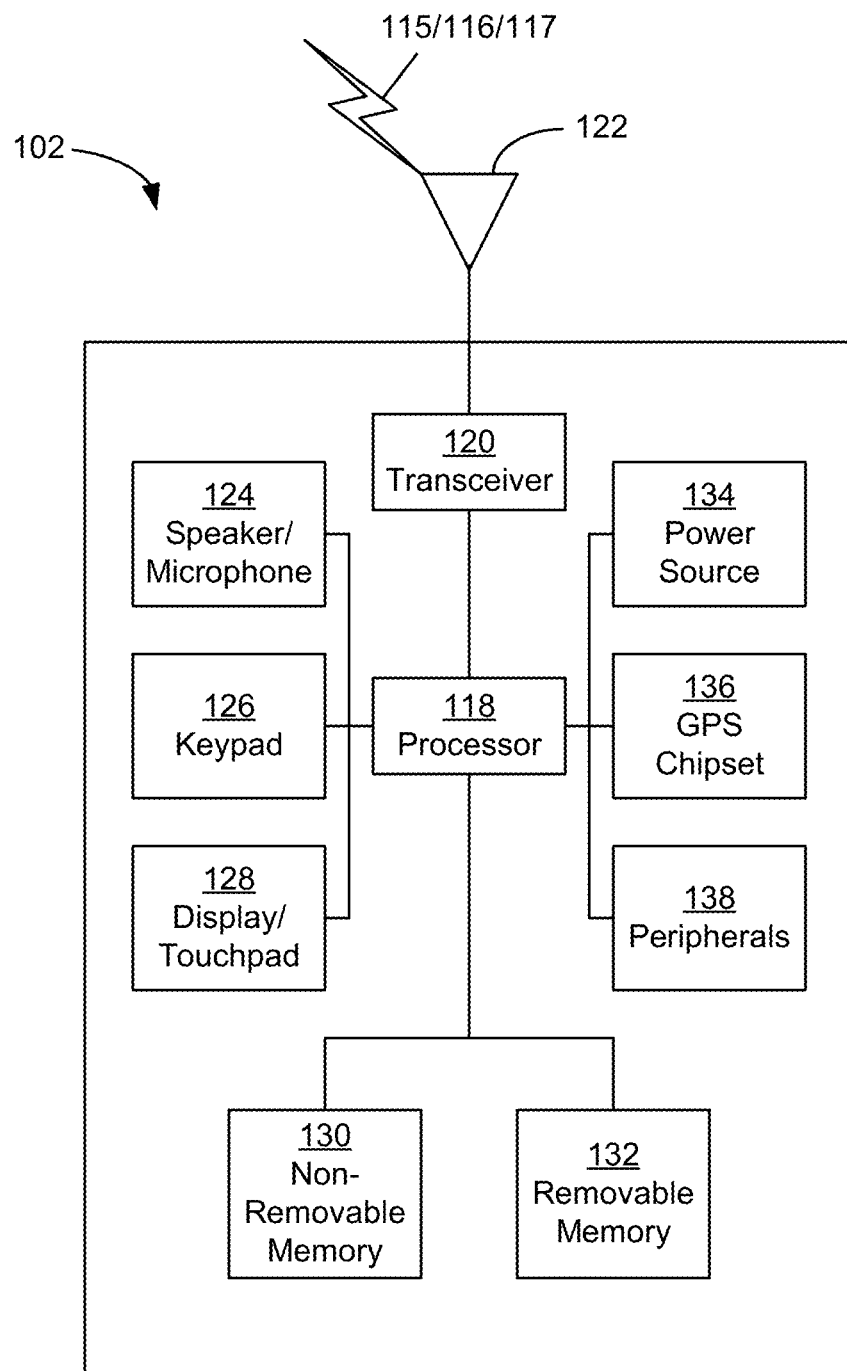
FIG. 1B is a system diagram of an example wireless transmit/receive unit (WTRU) that may be used within the communications system Illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive radio frequency (RF) signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and/or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/

117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 1C:
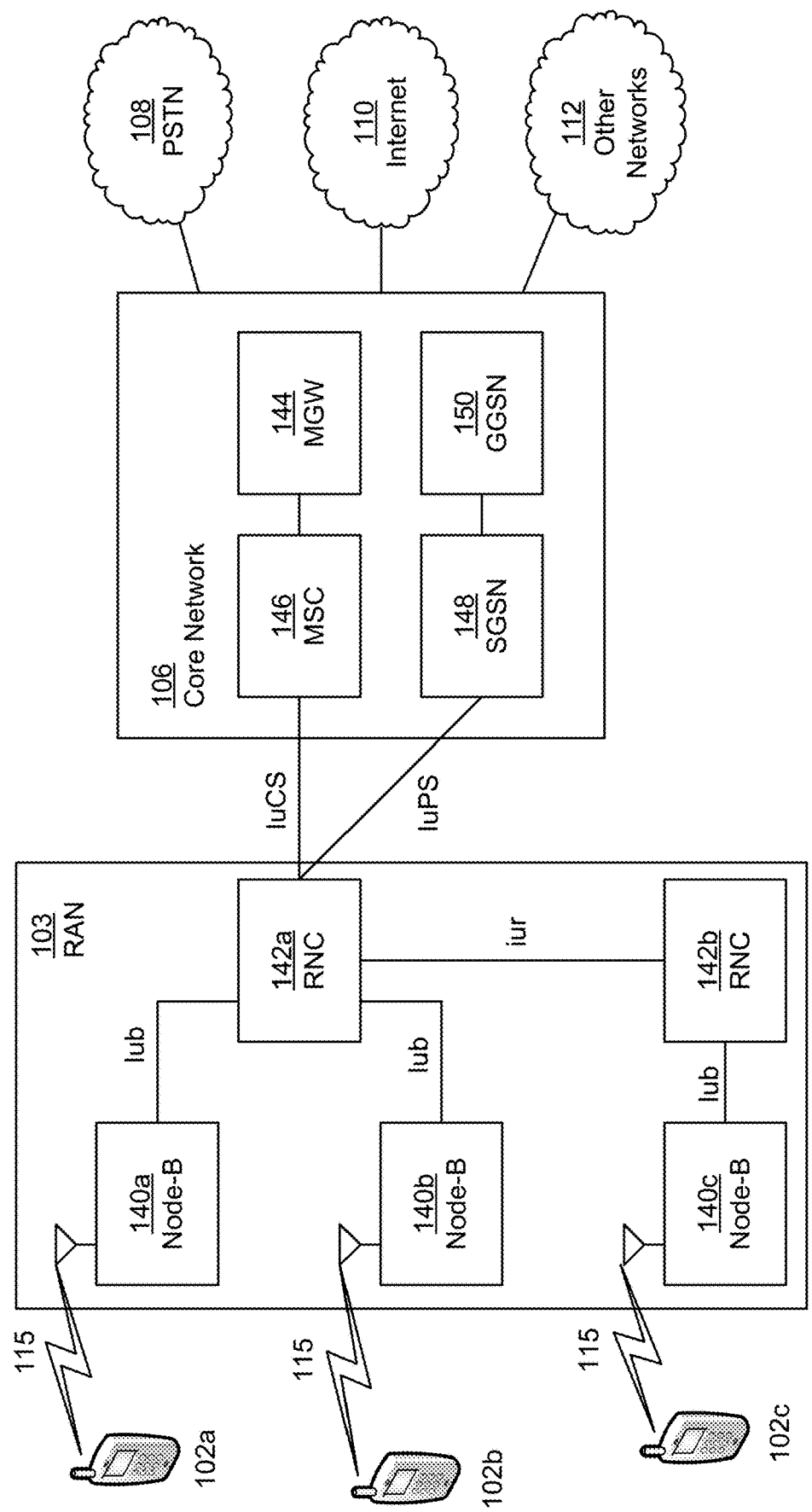
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and/or the like.

The core network 106 shown in FIG. 1C may include a media gateway (MGW) 144, a mobile switching center (MSC) 146, a serving general packet radio service (GPRS) support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
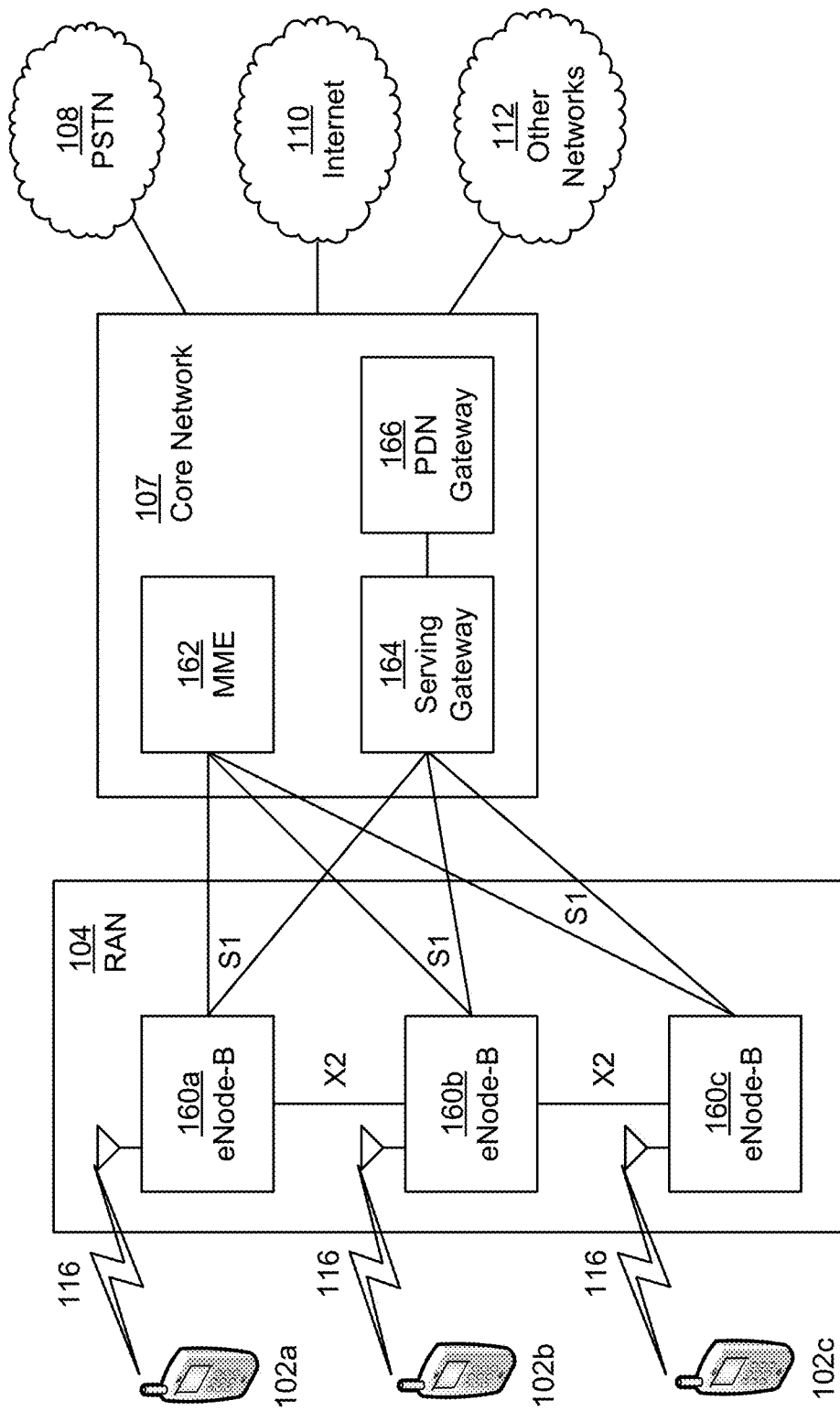
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and/or the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and/or the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
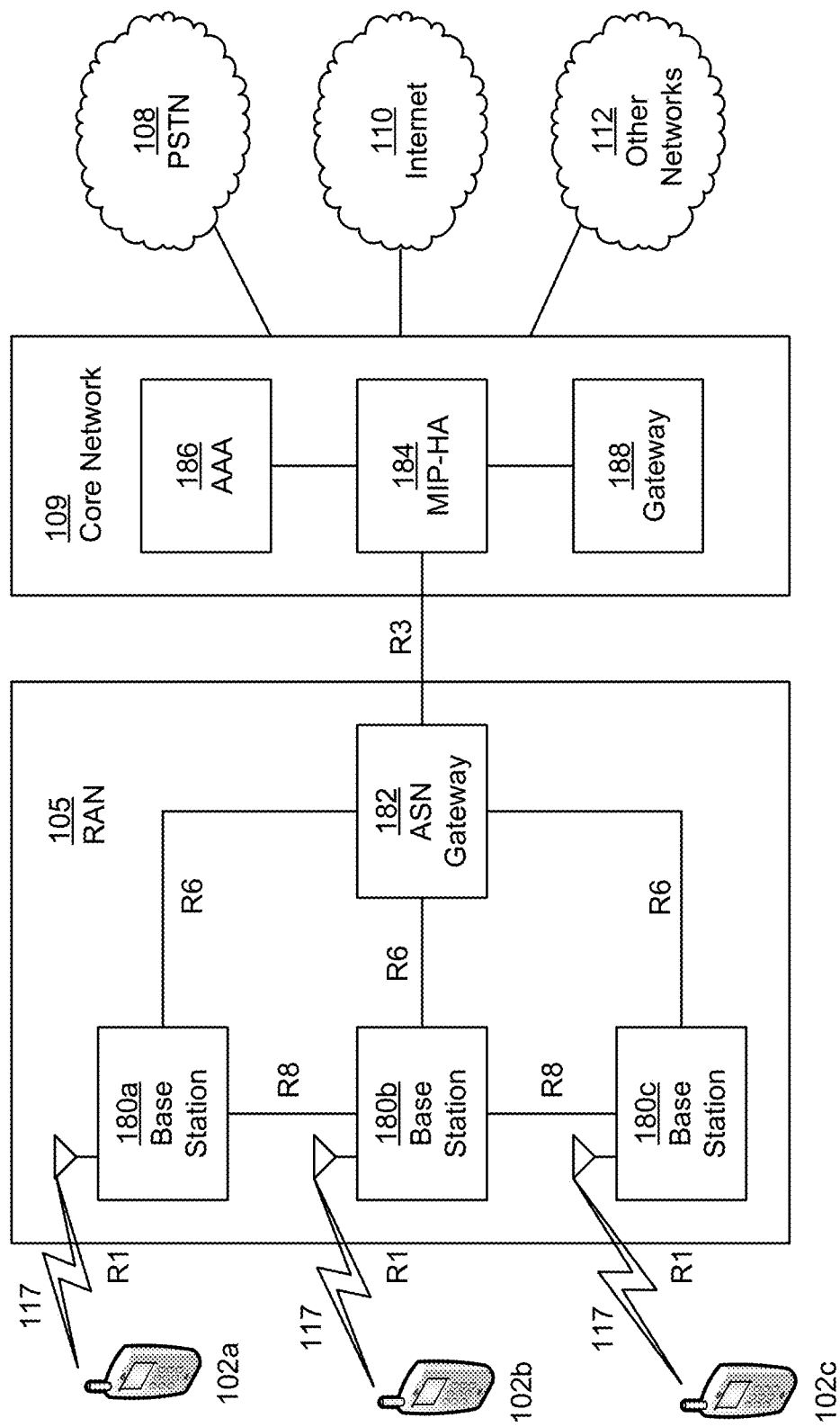
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and/or the like. The ASN gateway 182 may serve as a traffic aggregation point and may be responsible for paging, caching of subscriber profiles, routing to the core network 109, and/or the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In view of FIGS. 1A-1E, and the corresponding description of FIGS. 1A-1E, one or more, or all, of the functions described herein with regard to one or more of: WTRU 102a-d, Base Station 114a-b, Node B 140a-c, RNC 142a-b, MSC 146, SGSN 148, MGW 144, CGSN 150, eNode-B 160a-c, MME 162, Serving Gateway 164, PDN Gateway 166, Base Station 180a-c, ASN Gateway 182, AAA 186, MIP-HA 184, and/or Gateway 188, or the like, may be performed by one or more emulation devices (not shown) (e.g., one or more devices configured to emulate one or more, or all, of the functions described herein).

The one or more emulation devices may be configured to perform the one or more, or all, functions in one or more modalities. For example, the one or more emulation devices may perform the one or more, or all, functions while being fully or partially implemented/deployed as part of a wired and/or wireless communication network. The one or more emulation devices may perform the one or more, or all, functions while being temporarily implemented/deployed as part of a wired and/or wireless communication network. The one or more emulation devices may perform the one or more, or all, functions while not being implemented/deployed as part of a wired and/or wireless communication network (e.g., such as in a testing scenario in a testing laboratory and/or a non-deployed (e.g. testing) wired and/or wireless communication network, and/or testing performed on one or more deployed components of a wired and/or wireless communication network). The one or more emulation devices may be test equipment.

TABLE 1 is a list of abbreviations and acronyms that may be used herein.

TABLE 1

| | |
|---|---|
| Δf | Sub-carrier spacing |
| 5gFlex | 5G Flexible Radio Access Technology |
| 5gNB | 5GFlex NodeB |
| ACK | Acknowledgement |
| BLER | Block Error Rate |
| BTI | Basic TI (in integer multiple of one or more symbol duration) |
| CB | Contention-Based (e.g., access, channel, resource) |
| CoMP | Coordinated Multi-Point transmission/reception |
| CP | Cyclic Prefix |
| CP-OFDM | Conventional OFDM (relying on cyclic prefix) |
| CQI | Channel Quality Indicator |
| CN | Core Network (e.g., LTE packet core) |
| CRC | Cyclic Redundancy Check |
| CSI | Channel State Information |
| CSG | Closed Subscriber Group |
| D2D | Device to Device transmissions (e.g., LTE Sidelink) |
| DCI | Downlink Control Information |
| DL | Downlink |
| DM-RS | Demodulation Reference Signal |
| DRB | Data Radio Bearer |
| EPC | Evolved Packet Core |
| FBMC | Filtered Band Multi-Carrier |
| FBMC/OQAM | A FBMC technique using Offset Quadrature Amplitude Modulation |
| FDD | Frequency Division Duplexing |
| FDM | Frequency Division Multiplexing |
| FPI | Flow Priority Indicator |
| FPL | Flow Priority Level |
| ICC | Industrial Control and Communications |
| ICIC | Inter-Cell Interference Cancellation |
| IP | Internet Protocol |
| LAA | License Assisted Access |
| LBT | Listen-Before-Talk |
| LCH | Logical Channel |
| LCP | Logical Channel Prioritization |
| LLC | Low Latency Communications |
| LTE | Long Term Evolution e.g., from 3GPP LTE R8 and up |
| MAC | Medium Access Control |
| NACK | Negative ACK |
| MBB | Massive Broadband Communications |
| MC | MultiCarrier |
| MCS | Modulation and Coding Scheme |
| MIMO | Multiple Input Multiple Output |
| MTC | Machine-Type Communications |
| NAS | Non-Access Stratum |
| NR | New Radio access technology |
| OFDM | Orthogonal Frequency-Division Multiplexing |
| OOB | Out-Of-Band (emissions) |
| PBR | Prioritized Bit Rate |
| $P_{cmax}$ | Total available WTRU power in a given TI |
| PHY | Physical Layer |
| PRACH | Physical Random Access Channel |
| PDU | Protocol Data Unit |
| PER | Packet Error Rate |
| PL | Path Loss (Estimation) |
| PLMN | Public Land Mobile Network |
| PLR | Packet Loss Rate |
| PSS | Primary Synchronization Signal |
| QoS | Quality of Service (from the physical layer perspective) |
| RAB | Radio Access Bearer |
| RACH | Random Access Channel (or procedure) |
| RF | Radio Front end |
| RNTI | Radio Network Identifier |
| RRC | Radio Resource Control |
| RRM | Radio Resource Management |
| RS | Reference Signal |
| RTT | Round-Trip Time |
| SDU | Service Data Unit |
| SL | Sidelink |
| SCMA | Single Carrier Multiple Access |
| SOM | Spectrum Operation Mode |
| SS | Synchronization Signal |
| SSS | Secondary Synchronization Signal |
| SRB | Signalling Radio Bearer |
| SWG | Switching Gap (in a self-contained subframe) |

TABLE 1-continued

| | |
|---|---|
| TB | Transport Block |
| TBS | Transport Block Size |
| TDD | Time-Division Duplexing |
| TDM | Time-Division Multiplexing |
| TI | Time Interval (in integer multiple of one or more BTI) |
| TTI | Transmission Time Interval (in integer multiple of one or more TI) |
| TRP | Transmission/Reception Point |
| TRPG | TRP Group |
| TRx | Transceiver |
| UFMC | Universal Filtered MultiCarrier |
| UF-OFDM | Universal Filtered OFDM |
| UL | Uplink |
| URC | Ultra-Reliable Communications |
| URLLC | Ultra-Reliable and Low Latency Communications |
| V2V | Vehicle to vehicle communications |
| V2X | Vehicular communications |
| WLAN | Wireless Local Area Networks and related technologies (IEEE 802.xx domain) |

For initial 5G deployments that may use a phased approach, it may be expected that 5G systems may be deployed under the umbrella of an existing LTE system. In this LTE-Assisted deployment scenario, an LTE network may provide basic cellular functions such as mobility to/from LTE, core network functions and so on. As commercial 5G deployments may become more available, it may be expected that the deployments may evolve such that the 5G systems become standalone, independent of LTE. This second phase of 5G may be expected to target new use cases with stringent reliability and/or latency requirements.

A 5G flexible new radio (NR) access for 5G systems may be provided to enable improved broadband performance (IBB), industrial control and communications (ICC), vehicular applications (V2X) and/or massive machine-type communications (mMTC). The 5G interface may provide support for ultra-low transmission latency (LLC). Air interface latency may be as low as 1 ms round-trip time (RTT) and/or may provide support for TTIs somewhere between 100 us and (for example, perhaps no larger than) 250 us. The 5G interface may provide support for ultra-low access latency (e.g., time from initial system access until the completion of the transmission of the first user plane data unit) is of interest but of lesser priority. The 5G flexible air interface may provide support for end-to-end (e2e) latency of less than 10 ms. The 5G interface may provide support for ultra-reliable transmission (URC). Target may be 99.999% transmission success and/or service availability. The 5G interface may provide support for mobility for speed in the range of 0-500 km/h. At least IC and/or V2X may have packet loss ratio of less than $10^{e-6}$.

Support for machine-type communications (MTC) operation (including narrowband operation) may be provided. The air interface may support narrowband operation (e.g., using less than 200 KHz), extended battery life (e.g., up to 15 years of autonomy) and/or minimal communication overhead for small and infrequent data transmissions e.g., low data rate in the range of 1-100 kbps with access latency of seconds to hours.

A flexible NR access system for 5G, such as the 5gFLEX system, may be provided. OFDM is used as the basic signal format for data transmissions in LTE and/or in IEEE 802.11. OFDM may divide the spectrum into one or more, or multiple parallel orthogonal subbands. One or more, or each subcarrier is shaped using a rectangular window in the time domain leading to sinc-shaped subcarriers in the frequency domain. OFDMA may be associated with perfect frequency synchronization and/or tight management of uplink timing alignment within the duration of the cyclic prefix to maintain orthogonality between signals and/or to minimize intercarrier interference. Such tight synchronization might not be well-suited in a system where a WTRU is connected to one or more, or multiple access point simultaneously. Power reduction may be applied to uplink transmissions to compliant with spectral emission requirements to adjacent bands, for example in the presence of aggregation of fragmented spectrum for the WTRU's transmissions.

Some of the shortcomings of conventional OFDM (CP-OFDM) can be addressed by more stringent RF requirements for implementations, and/or perhaps when operating using large amount of contiguous spectrum not requiring aggregation. A CP-based OFDM transmission scheme may lead to a downlink physical layer for 5G similar to that of a legacy system e.g., mainly modifications to pilot signal density and/or location.

The 5gFLEX system may support other waveform candidates including the conventional OFDM (e.g., at least for the downlink transmission scheme). A number of principles applicable to the design of a flexible radio access for 5G are described herein. Such description is for example purposes and offered without intent to limit in any way the applicability of the methods described further herein to other wireless technologies and/or to wireless technology using different principles, when applicable.

The 5G Flexible Radio Access Technology (5gFLEX) downlink transmission scheme may be based on a multicarrier waveform characterized by high spectral containment (e.g., lower side lobes and/or lower Out-Of-Band (OOB) emissions). Multi-carrier (MC) waveform candidates for 5G may include, but not limited to, OFDM-OQAM (offset quadrature amplitude modulation) and/or universal filtered MultiCarrier (UFMC) (UF-OFDM).

Multicarrier modulation waveforms may divide the channel into subchannels and/or modulate data symbols on subcarriers in these subchannels. With OFDM-OQAM, a filter may be applied in the time domain per subcarrier to the OFDM signal to reduce OOB.

With UFMC (UF-OFDM), a filter may be applied in the time domain to the OFDM signal to reduce OOB. Filtering may be applied per subband to use spectrum fragments that may reduce complexity. This may make UF-OFDM somewhat more practical to implement.

Methods described herein are not limited to the waveforms described herein and/or may be applicable to other waveforms. The waveforms described herein will be further used for example purposes.

Such waveform(s) may enable multiplexing in frequency of signals with non-orthogonal characteristics (such as different subcarrier spacing) and/or co-existence of asynchronous signals without requiring complex interference cancellation receivers. It may facilitate the aggregation of fragmented pieces of spectrum in the baseband processing as a lower cost alternative to its implementation as part of the RF processing.

Different waveforms may coexist within the same band. The mMTC narrowband operation may be supported, for example, using single carrier multiple access (SCMA). The combination of different waveforms e.g., CP-OFDM, OFDM-OQAM and/or UF-OFDM within the same band may be supported for one or more, or all aspects of downlink and/or uplink transmissions. Such co-existence may include one or more transmissions using different types of waveforms between different WTRUs and/or transmissions from the same WTRU, e.g., simultaneously, with some overlap and/or consecutive formation in the time domain.

The uplink transmissions may use a same and/or different waveform as for downlink transmissions. Multiplexing of transmissions to and/or from different WTRUs in the same cell may be based on FDMA and/or TDMA.

The 5gFLEX radio access system may be characterized by a very high degree of spectrum flexibility that enables deployment in different frequency bands with different characteristics, including different duplex arrangements, different and/or variable sizes of the available spectrum including contiguous and/or non-contiguous spectrum allocations in the same and/or different bands. It may support variable timing aspects including support for one or more, or multiple TTI lengths and/or may support for asynchronous transmissions.

The 5gFLEX radio access system may provide flexibility in duplexing arrangement. TDD and/or FDD duplexing schemes can be supported. For FDD operation, supplemental downlink operation may be supported using spectrum aggregation. FDD operation may support full-duplex FDD and/or half-duplex FDD operation. For TDD operation, the downlink (DL)/uplink (UL) allocation may be dynamic. DL/UL allocation might not be based on a fixed DL/UL frame configuration. The length of a DL and/or a UL transmission interval may be set per transmission opportunity.

The 5gFLEX radio access system may provide bandwidth flexibility, e.g., to enable the possibility for different transmission bandwidths on uplink and/or downlink ranging from anything between a nominal system bandwidth up to a maximum value corresponding to the system bandwidth.

For single carrier operation, supported system bandwidths may, for example, include 5, 10, 20, 40, 80 MHz and/or the like. Supported system bandwidths could be any bandwidth in a given range e.g., from a few MHz up to 160 MHz. Nominal bandwidths could possibly have one or more fixed possible values. Narrowband transmissions of up to 200 KHz could be supported within the operating bandwidth for MTC devices.

Figure 2:
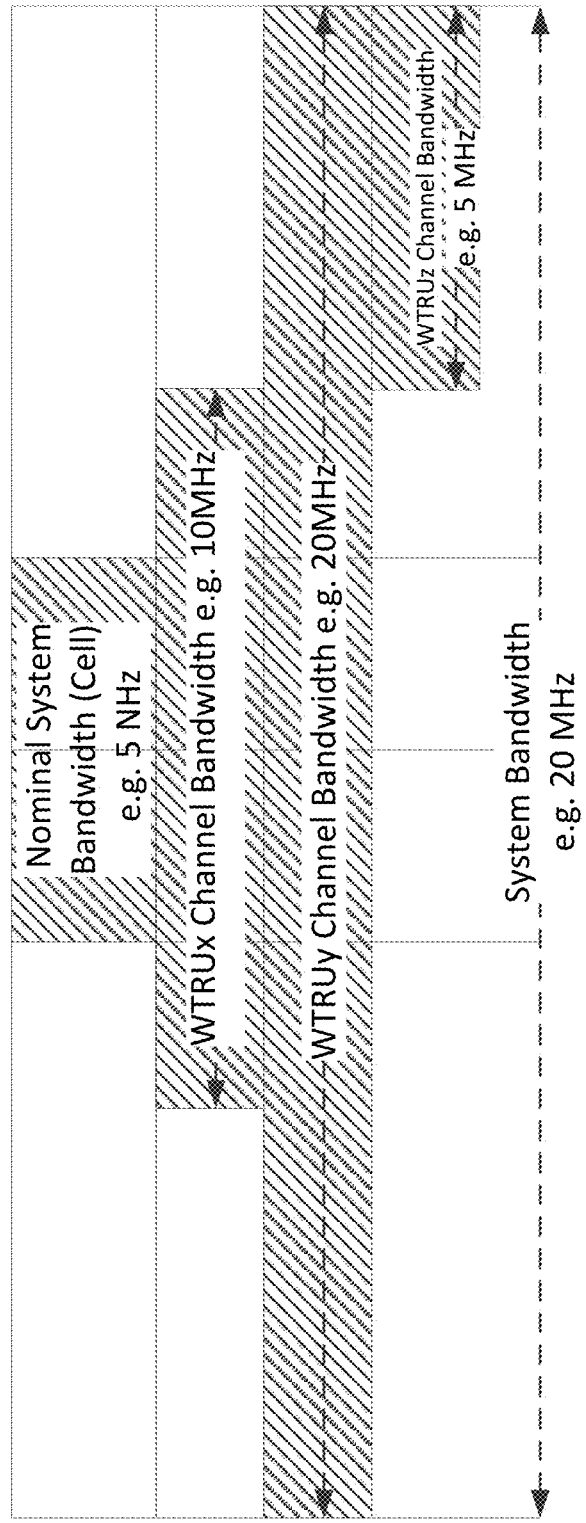
FIG. 2 illustrates example system bandwidths.

System bandwidth, as used herein, may include the largest portion of spectrum that can be managed by the network for a given carrier. For such carrier, the portion that a WTRU minimally supports for cell acquisition, measurements and/or initial access to the network may correspond to the nominal system bandwidth. The WTRU may be configured with a channel bandwidth that is within the range of the entire system bandwidth. FIG. 2 illustrates example system bandwidths. The WTRU's configured channel bandwidth may or might not include the nominal part of the system bandwidth as shown FIG. 2.

Bandwidth flexibility can be achieved because the applicable set of RF requirements for a given maximum operating bandwidth in a band can be met without the introduction of additional allowed channel bandwidths for that operating band due to the efficient support of baseband filtering of the frequency domain waveform.

Methods to configure, reconfigure and/or dynamically change the WTRU's channel bandwidth for single carrier operation may be contemplated as well as methods to allocate spectrum for narrowband transmissions within the nominal system, system and/or configured channel bandwidth.

The physical layer of a 5G air interface may be band-agnostic and/or may support operation in licensed bands below 5 GHz as well as operation in the unlicensed bands in the range 5-6 GHz. For operation in the unlicensed bands, listen-before-talk (LBT) Cat 4 based channel access framework similar to LTE license assisted access (LAA) may be supported.

Methods to scale and/or manage (e.g., scheduling, addressing of resources, broadcasted signals, measurements) cell-specific and/or WTRU-specific channel bandwidths for arbitrary spectrum block sizes may also be contemplated.

The 5gFLEX radio access system may provide flexible spectrum allocation. Downlink control channels and/or signals may support FDM operation. A WTRU can acquire a downlink carrier by receiving transmissions using the nominal part of the system bandwidth. For example, the WTRU might not (e.g., initially) receive transmissions covering the entire bandwidth that is being managed by the network for the concerned carrier.

Downlink data channels can be allocated over a bandwidth that may or might not correspond to the nominal system bandwidth, without restrictions other than being within the WTRU's configured channel bandwidth. For example, the network may operate a carrier with a 12 MHz system bandwidth using a 5 MHz nominal bandwidth allowing devices supporting at most 5 MHz maximum RF bandwidth to acquire and/or access the system while possibly allocating +10 to −10 MHz of the carrier frequency to other WTRU's supporting up to 20 MHz worth of channel bandwidth.

Figure 3:
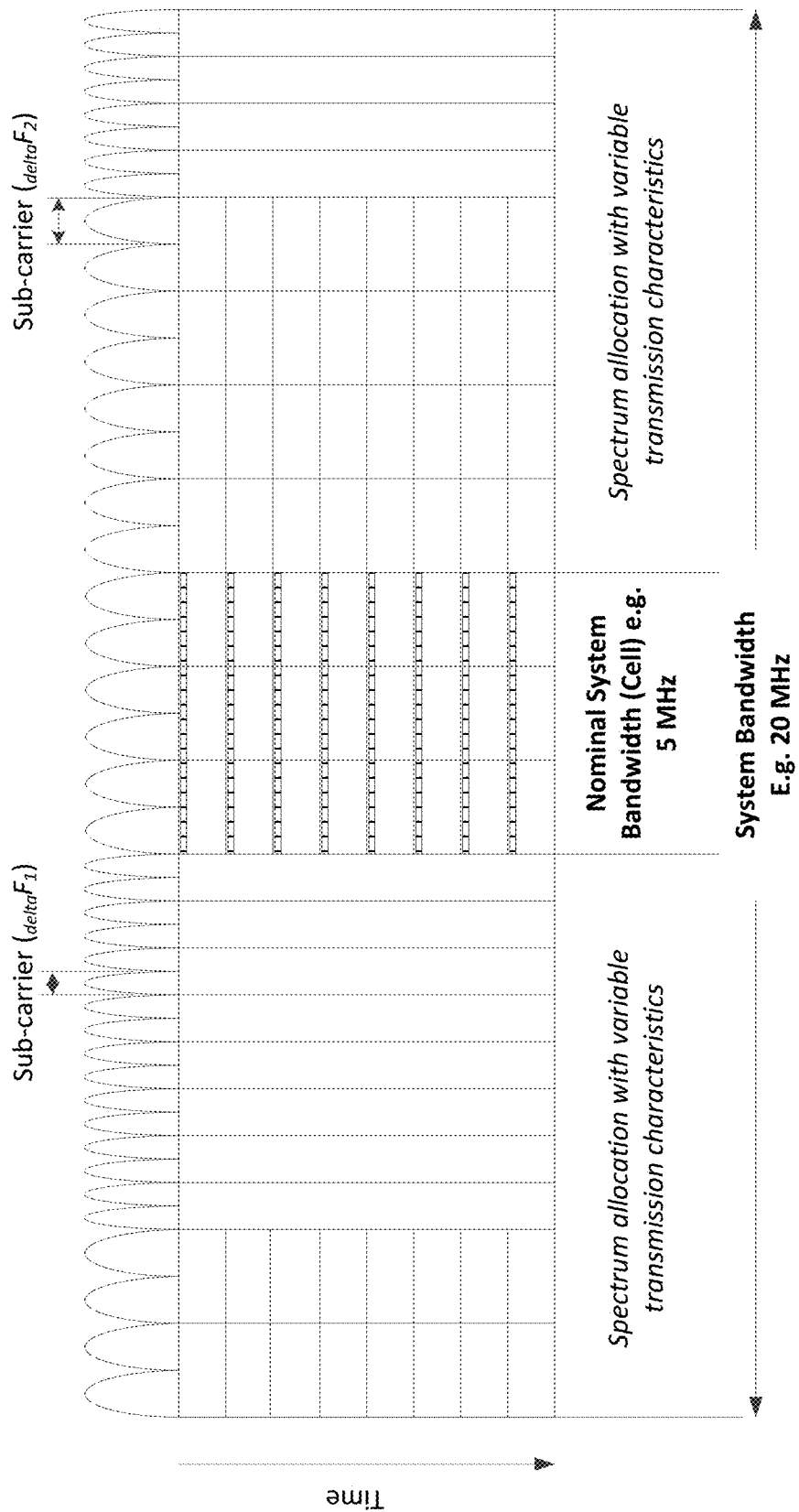
FIG. 3 illustrates example spectrum allocation where different subcarriers may be at least conceptually assigned to different modes of operation ("SOM").

FIG. 3 illustrates example spectrum allocation where different subcarriers may be at least conceptually assigned to different modes of operation (Spectrum Operating Modes (SOMs). Different SOMs can be used to fulfill different requirements for different transmissions. A SOM may include at least one of a subcarrier spacing, a TTI length, and/or one or more reliability aspects e.g., HARQ processing aspects, and/or a secondary control channel. A SOM may include a specific numerology. A SOM may include a specific waveform and/or may include a processing aspect e.g., in support of co-existence of different waveforms in the same carrier using FDM and/or TDM. Coexistence of FDD operation in a TDD band may be supported e.g., in a TDM manner and/or similar.

The WTRU may be configured to perform transmissions according to one or more SOMs. For example, a SOM may correspond to transmissions that may use at least one of the following: a specific TTI duration, a specific initial power level, a specific HARQ processing type, a specific upper bound for successful HARQ reception/transmission, a specific transmission mode, a specific physical channel (uplink and/or downlink), a specific operating frequency, band and/or carrier, and/or a specific waveform type and/or a transmission according to a specific RAT (e.g., legacy LTE and/or according to a 5G transmission method). A SOM may correspond to a QoS level and/or related aspect e.g., maximum/target latency, maximum/target block error rate (BLER) and/or the like. A SOM may correspond to a spectrum area and/or to a specific control channel and/or aspect thereof (including search space, downlink control information (DCI) type, etc.). For example, a WTRU may be configured with a SOM for one or more, or each of a URC type of service, a LLC type of service and/or a MBB type of service. A WTRU may have a configuration for a SOM for system access and/or for transmission/reception of L3 control signaling (e.g., radio resource control (RRC) signaling), e.g., in a portion of a spectrum associated to the system such as in a nominal system bandwidth as described herein.

For single carrier operation, spectrum aggregation may be supported whereby the WTRU may support transmission and/or reception of one or more, or multiple transport blocks over contiguous and/or non-contiguous sets physical resource blocks (PRBs) within the same operating band. A single transport block may be mapped to separate sets of PRBs. Support for simultaneous transmissions associated to different SOM requirements may be provided.

Multicarrier operation may be supported using contiguous and/or non-contiguous spectrum blocks within the same operating band and/or across two or more operating bands. Aggregation of spectrum blocks using different modes, e.g., FDD and/or TDD and/or using different channel access methods (e.g., licensed and/or unlicensed band operation below 6 GHz) may be supported. Support for methods that configure, reconfigure and/or dynamically change the WTRU's multicarrier aggregation may be provided.

Flexible framing, timing and/or synchronization may be supported. Downlink and/or uplink transmissions may be organized into radio frames characterized by a number of fixed aspects (e.g., location of downlink control information) and/or a number of varying aspects (e.g., transmission timing, supported types of transmissions).

The basic time interval (BTI) may be expressed in terms of an integer number of one or more symbol(s), and/or symbol duration that may be a function of the subcarrier spacing applicable to the time-frequency resource. For FDD, subcarrier spacing may differ between the uplink carrier frequency $f_{UL}$ and the downlink carrier frequency $f_{DL}$ for a given frame.

A transmission time interval (TTI) may be the minimum time supported by the system between consecutive transmissions. Consecutive transmissions may be associated with different transport blocks (TBs) for the downlink ($TTI_{DL}$), for the uplink transceiver (UL TRx) excluding any preamble (if applicable) but including any control information (e.g., DCI for downlink and/or uplink control information (UCI) for uplink). A TTI may be expressed in terms of integer number of one of more BTI(s). A BTI may be specific and/or associated with a given SOM.

Supported frame duration may include, but not limited to, 100 us, 125 us (⅛ ms), 142.85 us (⅐ ms is 2 nCP LTE OFDM symbols) and 1 ms to enable alignment with the legacy LTE timing structure.

A frame may start with downlink control information (DCI) of a fixed time duration $t_{dci}$ preceding any downlink data transmission (DL TRx) for the concerned carrier frequency $-f_{UL}+DL$ for TDD and $f_{DL}$ for FDD. For TDD duplexing (e.g., only), a frame may include a downlink portion (DCI and/or DL TRx) and/or an uplink portion (UL TRx). A switching gap (swg) may precede the uplink portion of the frame, if present.

For FDD duplexing (e.g., only), a frame may include a downlink reference TTI and/or one or more TTI(s) for the uplink. The start of an uplink TTI may be derived using an offset ($t_{offset}$) applied from the start of the downlink reference frame that may overlap with the start of the uplink frame.

For TDD, 5gFLEX may support Device to Device transmissions (D2D)/Vehicular communications (V2x)/Sidelink operation in the frame by including respective downlink control and/or forward direction transmission in the DCI+DL TRx portion (e.g., if a semi-static allocation of the respective resources is used) and/or in the DL TRx portion (e.g., only) (e.g., for dynamic allocation) and/or by including the respective reverse direction transmission in the UL TRx portion.

For FDD, 5gFLEX may support D2D/V2x/Sidelink operation in the UL TRx portion of the frame by including respective downlink control, forward direction and/or reverse direction transmissions in the UL TRx portion (e.g., dynamic allocation of the respective resources may be used).

Figure 4:
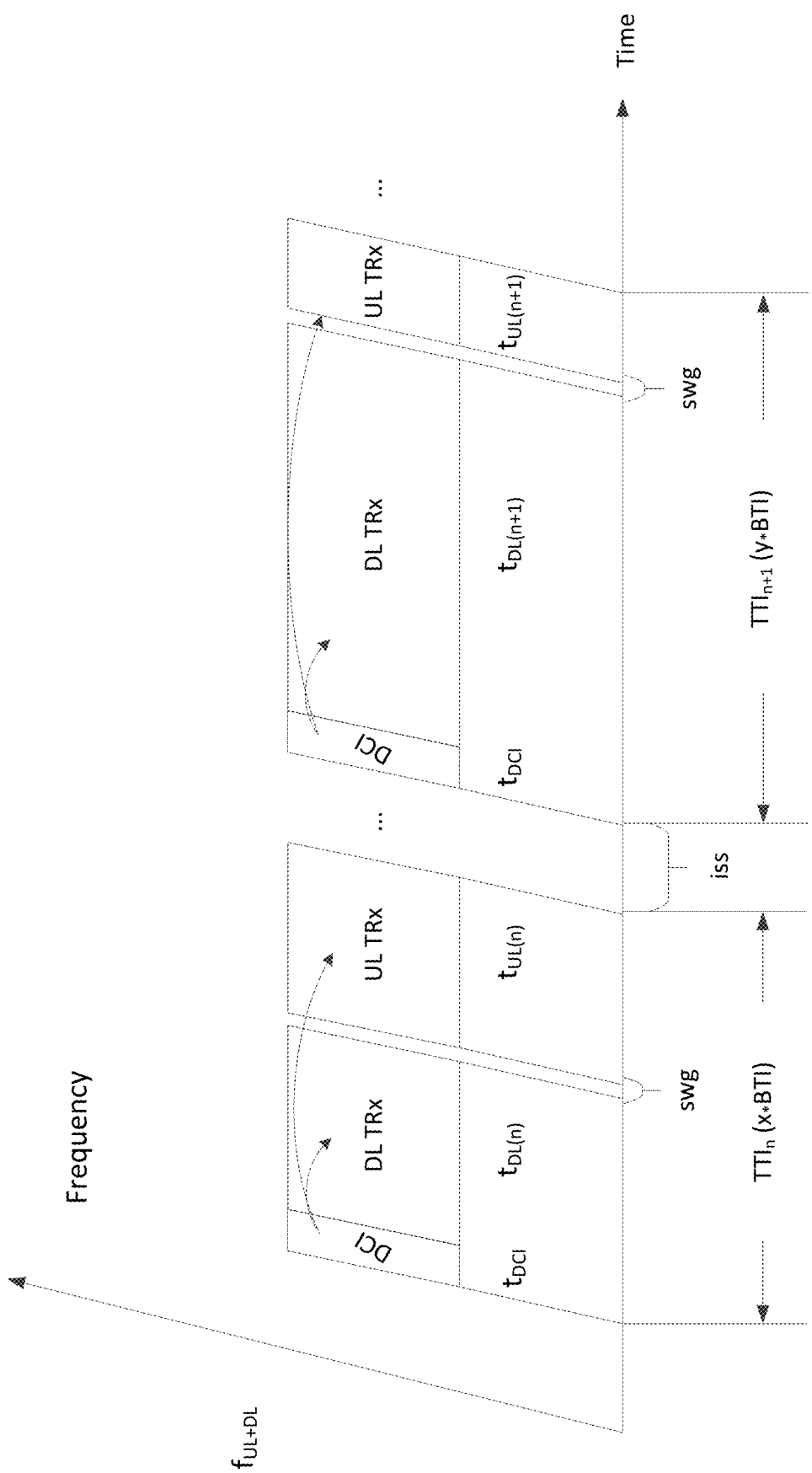
FIG. 4 illustrates example timing relationships for time-division duplexing (TDD).
Figure 5:
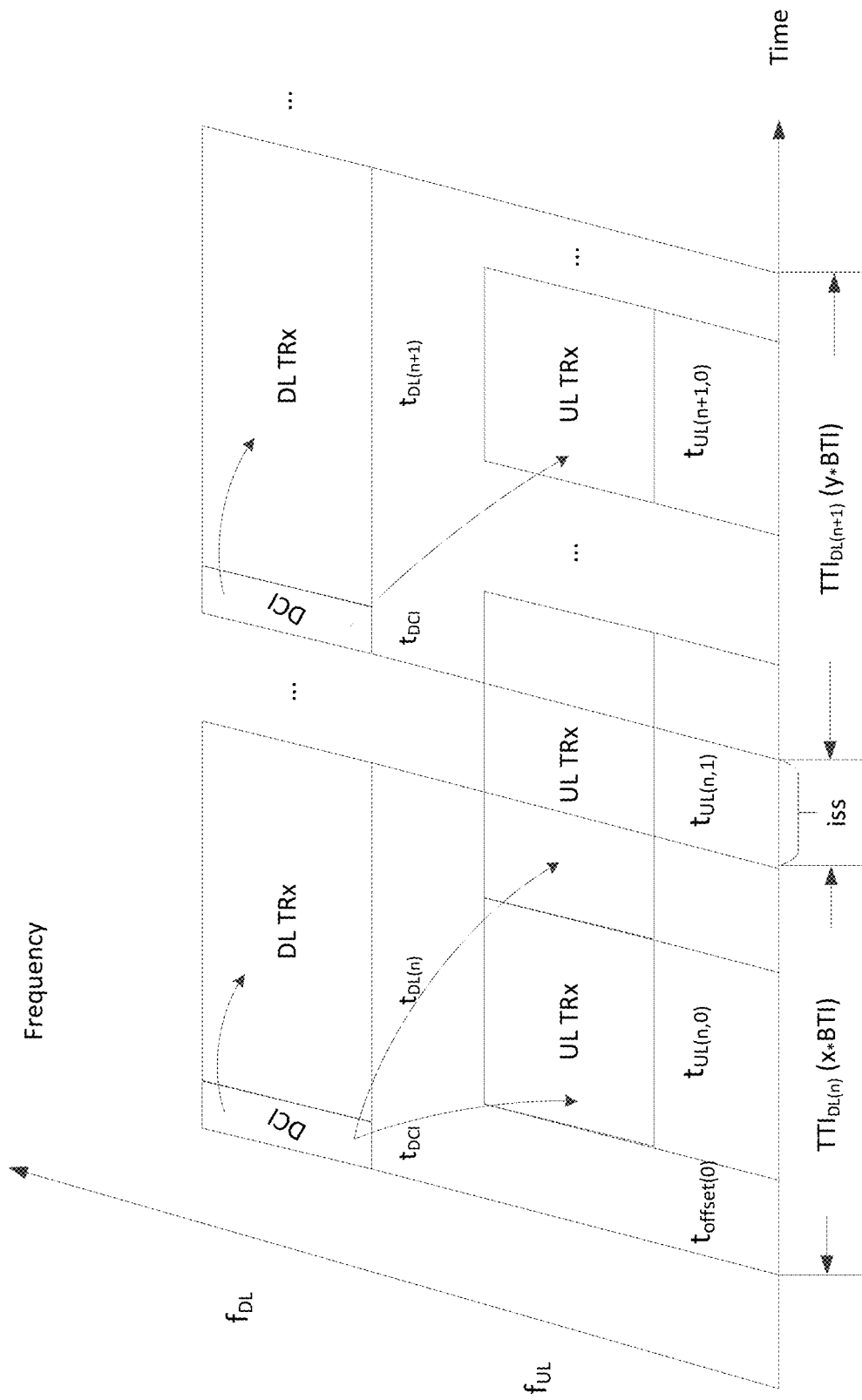
FIG. 5 illustrates example timing relationships for frequency division duplexing (FDD).

FIG. 4 illustrates example frame structure and frame timing relationships for TDD duplexing. FIG. 5 illustrates example frame structure and frame timing relationships for FDD duplexing.

A scheduling function may be supported in the MAC layer. A scheduling mode may be selected. The available scheduling modes may include network-based scheduling for tight scheduling in terms of resources, timing and/or transmission parameters of downlink transmissions and/or uplink transmissions, and/or WTRU-based scheduling for more flexibility in terms of timing and/or transmission parameters. Scheduling information may be valid for one or more, or multiple TTIs.

Network-based scheduling may enable the network to tightly manage the available radio resources assigned to different WTRUs such as to optimize the sharing of such resources. Dynamic scheduling may be supported.

WTRU-based scheduling may enable the WTRU to opportunistically access uplink resources with minimal latency on a per-need basis within a set of shared and/or dedicated uplink resources assigned (dynamically or not) by the network. Synchronized and/or unsynchronized opportunistic transmissions may be supported. Contention-based transmissions and/or contention-free transmissions may be supported. Opportunistic transmissions (scheduled and/or unscheduled) may be supported to meet the ultra-low latency requirements for 5G and/or the power saving requirement of the mMTC use.

Logical channel prioritization may be performed based on data available for transmission and/or available resources for uplink transmissions. Multiplexing of data with different QoS requirements within the same transport block may be provided.

Forward error correction (FEC) and/or block coding be performed. A transmission may be encoded using a number of different encoding methods. Different encoding methods may have different characteristics. For example, an encoding method may generate a sequence of information units. One or more, or each information unit, or block, may be self-contained. For example, an error in the transmission of a first block might not impair the ability of the receiver to successfully decode a second block, in particular if the second block is error-free and/or if sufficient redundancy can be found in the second block and/or in a different block for which at least a portion was successfully decoded.

Example of encoding methods may include raptor/fountain codes whereby a transmission may include a sequence of N raptor codes. One or more such codes may be mapped to one or more transmission "symbols" in time. A "symbol" may correspond to one or more set of information bits e.g., one or more octets. Such encoding may be used to add FEC to a transmission whereby the transmission could use N+1 and/or N+2 raptor codes (and/or symbols, assuming a one raptor code symbol relationship) so that the transmission may be more resilient to the loss of one "symbol" e.g., due to interference and/or puncturing by another transmission overlapping in time.

The WTRU may receive and/or detect one or more system signature. A system signature may include a signal structure using a sequence. Such signal may be similar to a synchronization signal e.g., similar to LTE primary synchronization signal (PSS) and/or secondary synchronization signal (SSS). Such signature may be specific (e.g., uniquely identify) to a particular node (and/or transmission/reception point (TRP)) within a given area and/or it may be common to a plurality of such nodes (and/or TRPs) within an area. Such aspect might not be known and/or relevant to the WTRU. The WTRU may determine and/or detect a system signature sequence and/or may determine one or more parameters associated to the system. For example, the WTRU may derive an index therefrom, and/or may use such index to retrieve associated parameters e.g., within a table such as the access table described below. For example, the WTRU may use the received power associated with the signature for open-loop power control e.g., to set the initial transmission power if the WTRU determines that it may access (and/or transmit to) using applicable resources of the system. For example, the WTRU may use the timing of the received signature sequence e.g., to set the timing of a transmission (e.g., a preamble on a physical random access channel (PRACH) resource) if the WTRU determines that it may access (and/or transmit) using applicable of the system.

The WTRU may be configured with a list of one or more entries. Such list may be referred to as an access table. Such list may be indexed, whereby one or more, or each entry may be associated to a system signature and/or to a sequence thereof. Such access table may provide initial access parameters for one or more areas. One or more, or each such entry may provide one or more parameters useful for performing an initial access to the system. Such parameters may include at least one of a set of one or more random access parameters e.g., including applicable physical layer resources (e.g., PRACH resources) in time and/or frequency, initial power level, physical layer resources for reception of a response. Such parameters may include access restrictions e.g., including public land mobile network (PLMN) identity and/or closed subscriber group (CSG) information. Such parameters may include routing-related information such as the applicable routing area(s). One or more, or each such entry may be associated with (and/or indexed by) a system signature. In other words, one such entry may possibly be common to a plurality of nodes (and/or TRPs). The WTRU may receive such access table by way of a transmission using dedicated resources e.g., by RRC configuration and/or by way of a transmission using broadcasted resources. In the latter case, the periodicity of the transmission of an access table may be relatively long (e.g., up to 10240 ms) e.g., it may be longer than the periodicity of the transmission of a signature (e.g., in the range of 100 ms).

A logical channel (LCH) may represent a logical association between data packets and/or PDUs. LCH may have a different and/or broader meaning than a similar term for previous generations, such as LTE systems. For example, a logical association may be based on data units being associated with the same bearer and/or being associated with the same SOM and/or slice (e.g., a processing path using a set of physical resources). For example, an association may be described by one or more of; a chaining of processing functions; an applicable physical data (and/or control) channel (and/or instance thereof); and/or an instantiation of a protocol stack. The association may be described by downlink control information in signaling received, perhaps for example in the allocation of resources for uplink transmission. This may include a portion being centralized, such as PDCP (e.g., only) and/or anything beyond portions of the physical layer processing (e.g., Radio Front (RF) end) and/or another portion being closer to the edge (e.g., MAC/PHY in the TRP and/or RF (e.g., only)), which may be separated by a front hauling interface, for example. The term LCH may herein have a different and/or broader meaning than the similar term for LTE systems.

The WTRU may be configured such that it may determine such relationship between different data units. Possibly, such relationship may be based on a matching function e.g., based on the configuration of one or more field values common to data units that are part of the same logical association. Such fields may correspond to fields in a protocol header associated with the data unit(s). For example, such matching function may use a tuple of parameters for fields of the IP headers of the data unit such as IP source/destination address(es), transport protocol source/destination port(s) and/or transport protocol type. The IP protocol may include various versions such as e.g., IPv4 and/or IPv6.

For example, data units that are part of the same logical association may share a common radio bearer, processing function, SOM and/or may at least conceptually correspond to the same LCH and/or LCG.

A logical channel group (LCG) may include a group of LCH(s) and/or equivalent (e.g., as described above). The term LCG as used herein may have a different and/or broader meaning than a similar term for previous generations, such as LTE systems. A grouping may be based on one or more criteria. For example, criteria may be that one or more LCH(s) have a similar priority level that is applicable to (associated with) one or more of: one or more, or all LCHs of the same LCG (similar to legacy), the same SOM (and/or type thereof); and/or the same slice (and/or type thereof). For example, an association may be described by one or more of: a chaining of processing functions, an applicable physical data (and/or control) channel (and/or instance thereof); and/or instantiation of a protocol stack, which may include a specific portion being centralized (e.g., PDCP (e.g., only) and/or anything except RF) and/or another portion being closer to the edge (e.g., MAC/PHY in the TRP, and/or RF (e.g., only)), which may be separated by a fronthauling interface.

A transport channel (TrCH) may include a (e.g., specific) set of processing actions and/or a set of functions applied to data information that may affect one or more transmission characteristics over a radio interface.

A transport block may be associated with a specific characteristic such as one or more of a (e.g., specific) SOM, a set of physical resources, a logical transport channel, and/or information received in downlink control signaling, such as a multiplexing indication indicated in the grant information.

TrCH may be defined (e.g., for LTE) with one or more, or multiple types of TrCH, such as the Broadcast Channel (BCH), the Paging Channel (PCH), the Downlink Shared Channel (DL-SCH), the Multicast Channel (MCH), the Uplink Shared Channel (UL-SCH) and/or the Random Access Channel, which may or might not carry user plane data. Main transport channels for carrying user plane data may be the DL-SCH and/or the UL-SCH, e.g., for the downlink and uplink, respectively.

TrCH may include an augmented set of requirements supported by the air interface and/or support for one or more, or multiple transport channels (e.g., for user and/or control plane data) for one or more WTRU devices. TrCH may have a different and/or broader meaning than a similar term for previous generations, such as LTE systems. For example, a transport channel for URLLC (e.g., URLLCH), for mobile broadband (MBBCH) and/or for machine type communications (MTCCH) may be defined for downlink transmission (e.g., DL-URLLCH, DL-MBBCH and/or DL-MTCCH) and/or for uplink transmissions (e.g., UL-URLLCH, UL-MBBCH and/or UL-MTCCH).

For example, one or more, or multiple TrCHs may be mapped to a different set of physical resources (e.g., PhCH) belonging to the same SOM. This mapping may be advantageous, for example, to support simultaneous transmission of traffic with different requirements over the same SOM. For example, a URLLCH may be transmitted along MTCCH simultaneously, for example, when a WTRU may be configured with a single SOM.

A WTRU may be configured with one or more parameters associated with a characterization of how data may be transmitted. A characterization may represent constraints and/or requirements that a WTRU may be expected to meet and/or enforce. A WTRU may perform different operations and/or adjust its behavior as a function of the state associated with data based on a characterization. Parameters may include, for example, time-related aspects (such as Time to Live (TTL) for a packet, which may represent the time before which the packet may be transmitted to meet, acknowledge, etc. to meet latency requirements), rate-related aspects and/or configuration related aspects (e.g., absolute priority). Parameters may be changed with time while the packet and/or data may be pending for transmission.

One or more of the following list of parameters may be included in the QoS framework definition for NR: Flow Priority Indicator (FPI) (define priority per flow treatment at UP and/or AN functions. It may correspond to scheduling priority as well as priority handling in case of congestion. The FPI also indicates whether the flow requires guaranteed flow bitrate and/or maximum flow bitrate); and/or Flow Priority Level (FPL) (defines the flow relative importance to access to AN resource. The FPL may indicate whether the access to AN non-prioritized resource may be pre-emptable and/or resources allocated may be protected from pre-emption). A QoS policy may include at least one of a FPI, FPL, prioritize/guaranteed/aggregated bit rate, packet loss rate, packet delay budget, maximum transmission delay, jitter, inter-packet delay and/or the like.

Figure 6:
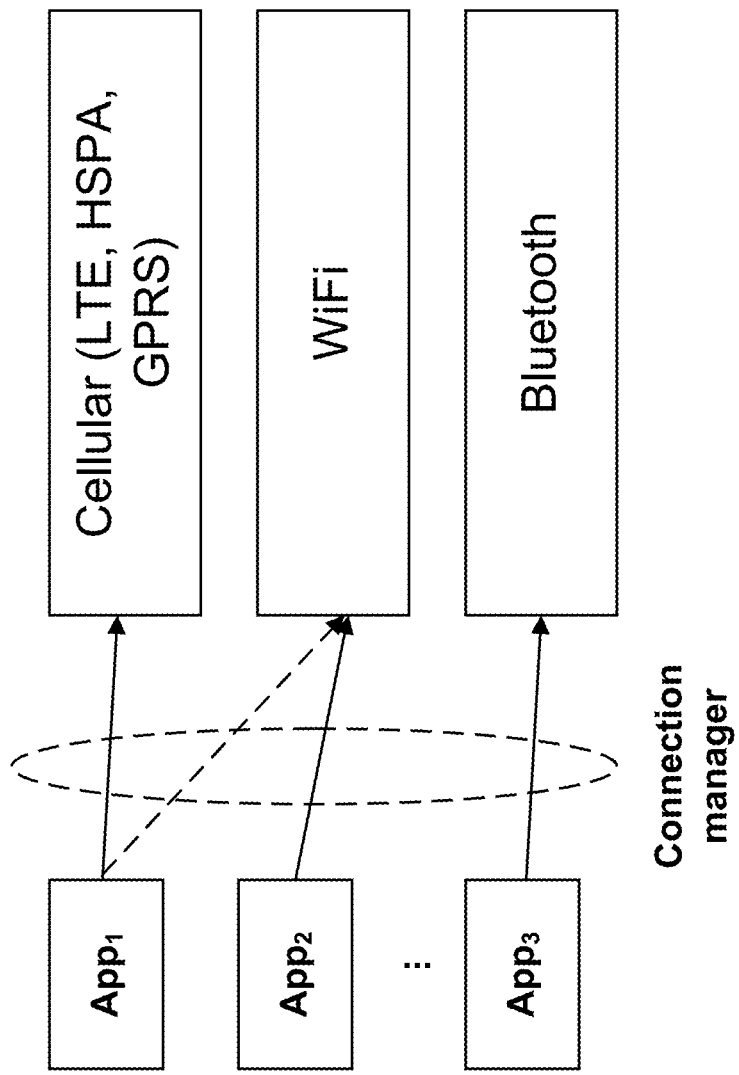
FIG. 6 illustrates example connection management.

FIG. 6 shows example connection management. A user equipment (e.g., modem smartphone, tablet, and/or other device) may be equipped with a number of radio access technologies operating in various bands, including for example LTE, Wifi, HSPA, and/or Bluetooth. The applications generate data that may be routed to the wireless network via one of the configured interface in the device. Devices may have one or more, or multiple interface, and in that case the connection managers may ensure that the application data is routed to the proper interface.

For the next generation of wireless systems, NR, the number of interfaces might not (e.g., only) increase due to the additional radio supported. One or more, or each radio interface may likely be able to operate in one or more, or multiple spectrum bands and/or in different modes. For example, LTE may support Licensed Assisted Access (LAA) and/or operate in the traditional WiFi band.

NR may support one than one (e.g., different) numerologies for a WTRU. One or more, or all grants might not be equal. A WTRU may have traffic associated with different QoS requirements. A WTRU may have access to resources (and/or different set thereof), processing functions (and/or chains thereof) that may offer (and/or exhibit) different service characteristics from the perspective of QoS enforcement and/or guarantees. The WTRU may determine how to associate data units with such resources and/or processing functions. The WTRU may determine how to associate user plane data with a suitable "over-the-air" treatment that may correspond to its associated QoS profile. The WTRU may determine how to associate user plane data with a granularity that may support such treatment being applied per flow and/or per IP packet.

Figure 7:
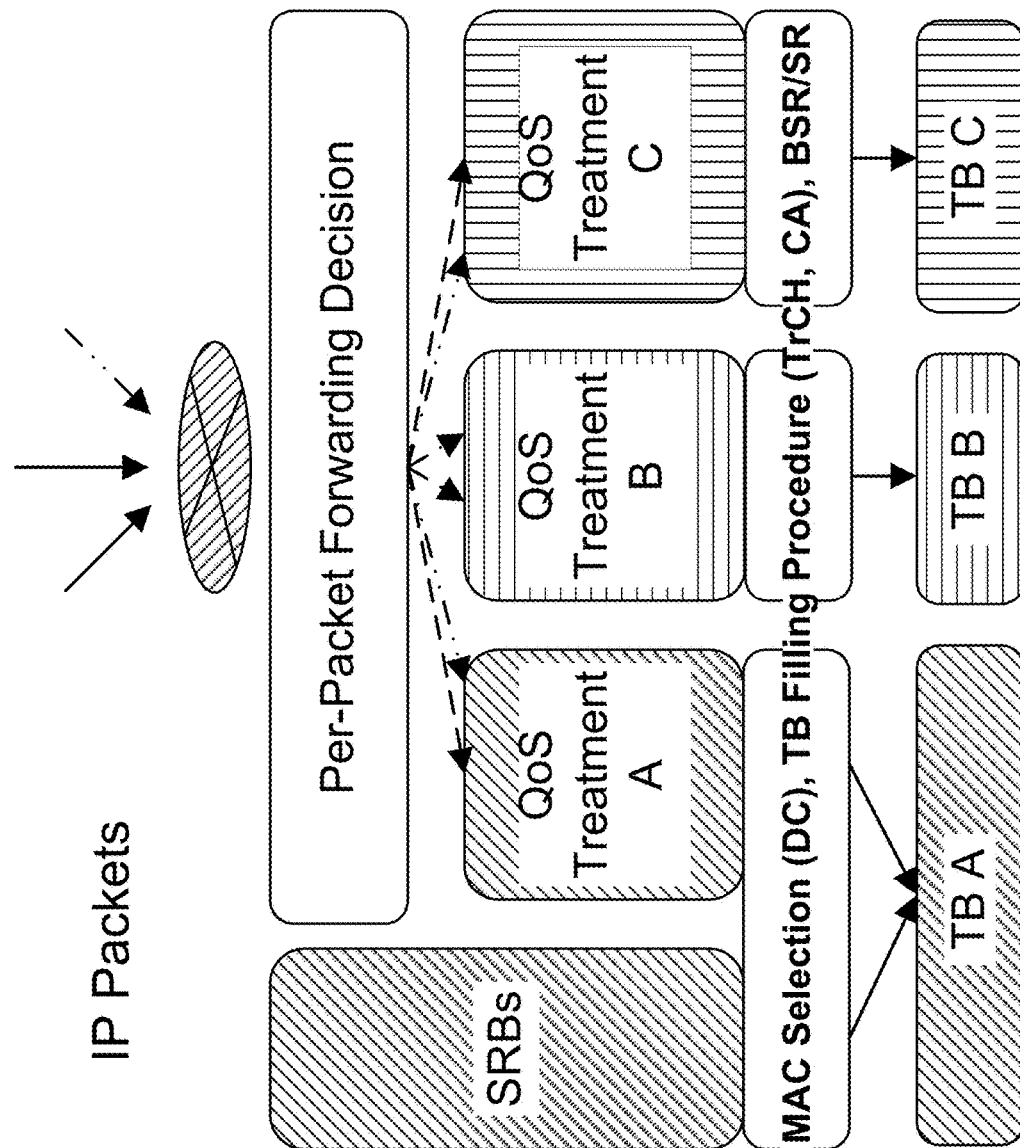
FIG. 7 illustrates an example architecture for L2/L1 handling of data units.
Figure 8:
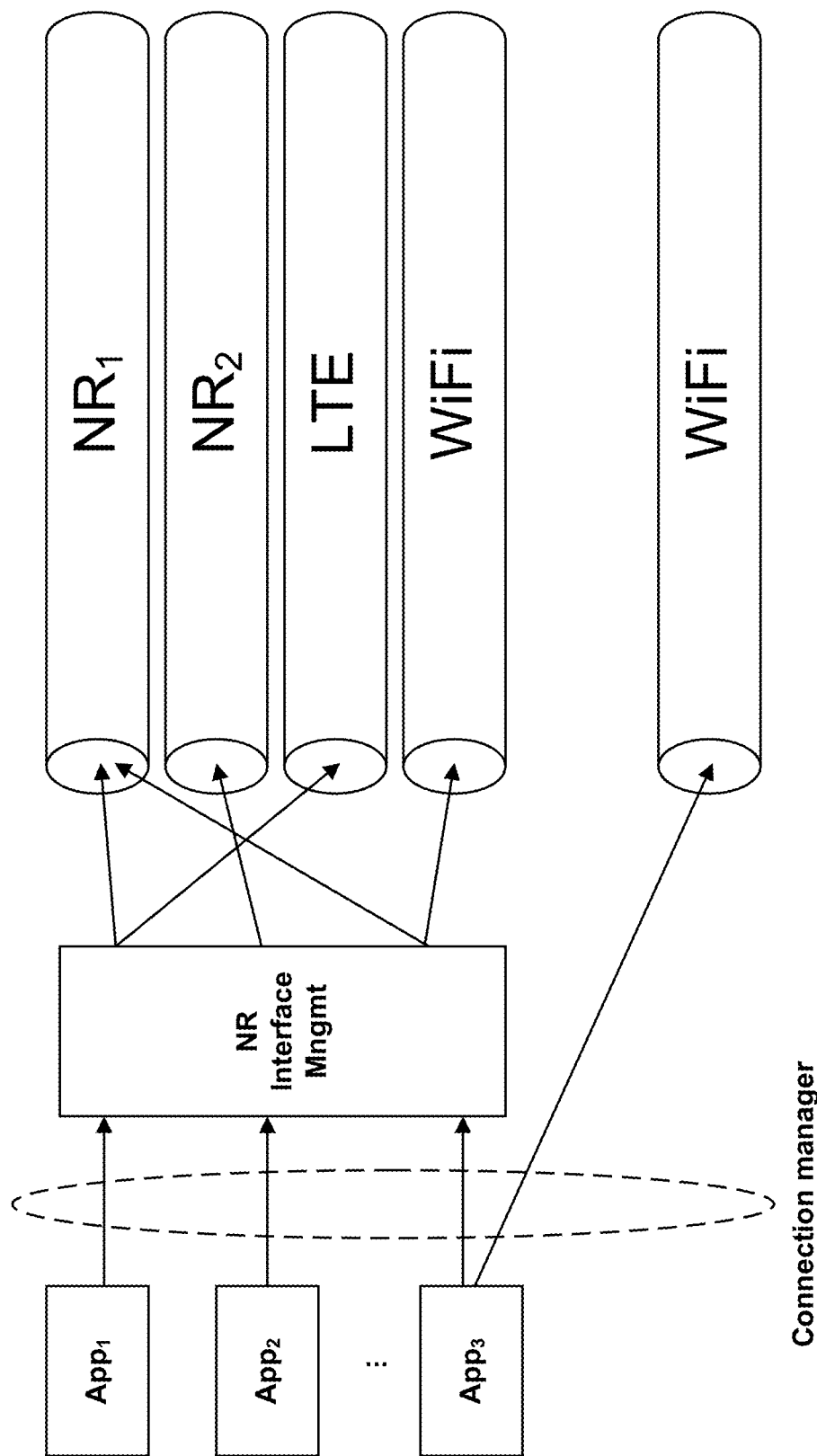
FIG. 8 illustrates example connection management.

FIG. 7 illustrates an example architecture for L2/L1 handling of data units.

Packet forwarding determination may be performed. Different methods to associate IP packets may be provided. The WTRU may determine that one or more data units correspond to a flow of such data units. The WTRU may be configured to perform per-packet forwarding decisions. The WTRU may perform such determination as a function of one or more matching rule(s).

A matching rule may include one or more sets of one or more of: protocol field/pattern(s), size of data unit, sequence in specific outcome (e.g., positive hits), specific protocol packet type, time-based rule, number of data units-based rule, amount of data-based rule, type of traffic, Application type, Observed QoS, a direction QoS policy indication, and/or a direction.

Protocol Field/Pattern(s): one or more pattern(s) associated to a field of a protocol SDU corresponding to the data unit. For example, such field may be a source or destination IP address, a source or destination port, a transport protocol type (e.g., UDP, TCP), a protocol version (e.g., IPv4, IPv6), a TOS field, and/or the like. Such patterns may include wildcards and/or all-matching elements whereby the value for at least a portion of the field is not verified (and/or always result is a positive match). Such patterns may include exclusion elements whereby the value for at least a portion of the field is verified to ensure that it does not match a specific pattern (and/or always result is a negative match). For example, the WTRU may be configured with a matching rule that include a pattern for the destination IP address for uplink direction. For example, any packet matching the destination may be treated and/or handled similarly e.g., a server-based handling. For example, the WTRU may associate such data units with a processing chain that enforces a specific QoS e.g., for uplink transmissions. For example, the WTRU may be configured with a matching rule that include a pattern for the destination transport protocol port for uplink direction. For example, any packet matching the destination port be treated and/or handled similarly e.g., a service-based handling. Other combinations and/or meaning may be represented accordingly.

Size of Data Unit and/or Transport Block (TB): One or more characteristic(s) may be associated to other aspects of the data unit and/or TB, such as size of the data unit and/or TB, and/or such as a maximum/minimum size for the data unit and/or TB. For example, the WTRU may be configured to generate a positive match for a data unit and/or TB that is no larger than a specific size. For example, the WTRU may be configured to generate a positive match for a data unit and/or TB that is of an exact size possibly within a set of one or more size values for the rule.

Sequence in specific outcome (e.g., positive hits): a matching rule may include one or more position(s) (e.g., first match, all up to third match, etc.) specific outcome (e.g., positive match). Such may be applied in combination with one or more other rules. For example, such may be applied for one or more, or all rules, for a subset (e.g., for one or more, or all rules associated to a bearer, LCH and/or similar grouping) and/or for a specific rule (e.g., for a rule matching a single flow). For example, such may be used to determine the packets used by a transport protocol during the opening of a data transfer connection (e.g., TCP).

Specific protocol packet type: one or more packet types associated to a protocol of the concerned data unit. For example, such may be used to determine the packets used by a transport protocol during the opening of a data transfer connection (e.g., TCP SYN) and/or closing thereof (TCP FIN).

Time/number of data units/amount of data-based rule: a value in time, in number of data units and/or in amount of data since a specific outcome (e.g., positive) for another rule. For example, such may be used to determine a subset of data units for which to apply a specific treatment (e.g., temporary routing to a different set of resources and/or processing). For example, such may be used to apply processing that provides lower latency than otherwise during the slow start phase of a rate-controlled protocol such as TCP.

Type of traffic: One or more characteristic(s) associated to other aspects of the data unit such as type of traffic. For example, the WTRU may be configured to generate a positive match for a data unit that is associated to a control protocol, to application data, to background data, to streaming data and/or the like.

Application type: One or more characteristic(s) may be associated to other aspects of the data unit such as an application type. For example, the WTRU may be configured to generate a positive match for a data unit that is associated to a specific higher layer request e.g., NAS. Such may correspond to a specific socket which may be implementation-specific.

Observed QoS e.g., bit rate, packet loss rate, jitter, packet delay budget, maximum transmission delay, inter-packet delay, and/or the like: one or more characteristic(s) associated to other aspects of the data unit such as metrics observed for a specific subset of data units. Such subset may be determined in combination with one or more other rules. For example, the WTRU may determine an outcome in relation with an associated QoS policy. A WTRU may determine that packets matching a specific rule, and/or that may be associated with a configured Guaranteed Bit Rate (GBR), may be handled such that the WTRU applies a first packet forwarding treatment (e.g., uses services of a first radio bearer) up to the GBR and/or a second packet forwarding treatment (e.g., uses services of a second radio bearer) for data unit(s) in excess of the GBR e.g., for a given service. For example, such a mechanism may be based on a bucket that fills with time and that is emptied as data units are forwarded to lower layers for transmission; when the bucket is non-zero, the WTRU may apply a first packet forwarding treatment while it may apply a second packet forwarding treatment otherwise.

A QoS policy indication: an identity of the applicable QoS policy. For example, the WTRU may determine such identity and/or applicable QoS policy based on packet marking (e.g., a field value in a protocol header of the data unit and/or in a field of the corresponding MAC PDU).

A direction: e.g., uplink and/or downlink: One or more characteristic(s) may be associated to other aspects of the data unit such as whether the data unit originates (e.g., for uplink transmission) and/or is received (e.g., from a downlink transmission) by the WTRU.

Combination of rules may be possible, in which case their applicability and/or corresponding handling of the data unit may be applied, for example sequentially. The WTRU may be configured with one or more, or multiple rules that may apply in a specific order. A default handling may be applied to a data unit that might not otherwise be handled by the configured rules.

Rules may be associated with a packet forwarding treatment. A rule may be associated with one or more processing functions as described herein. Such one or more processing functions may correspond to a packet forwarding treatment. Such one or more processing functions may correspond to a radio bearer and/or to a logical channel of the WTRU's configuration.

Rules may be associated with a TB filling mechanism, BSR/SR mechanism and/or a related configuration. A rule may be associated with a configuration for prioritization of the determine data units by the MAC entity, e.g., upon determination of the data to include in an uplink transmission, and/or for example upon determination whether or not to initiate a Buffer Status Reporting, a Scheduling Request, an access to the resources of the system and/or in the selection of the applicable resources.

Rules may be active, inactive, and/or bounded in time. A rule may be configured and active, or configured and inactive. Upon configuration that adds and/or modify a rule, the initial state may be active. Transition to the inactive state may occur following a specific amount of time (e.g., based on a configurable timer) without any positive match for the concerned rule. Such time may be a configuration aspect of the WTRU and/or may be rule-specific. In one method, a rule may be associated to a rule for deactivation (e.g., determination that the last packet of a flow has been seen, and/or the time-based rule described herein).

Rules may be configured by L3. The WTRU may be configured with one or more rules by the RRC protocol. The WTRU may be configured with one or more QoS policy/policies. A QoS policy may include one or more rules. One or more rules may be associated with a QoS policy. A QoS policy may include FPI and/or FPL. One or more specific QoS policies may be associated with a value tag and/or an identity. The WTRU may be configured with one or more QoS policies by the RRC protocol.

A packet forwarding treatment may be associated with a rule, and/or, may correspond to a bearer. The WTRU may be configured to apply one or more processing function(s). Such functions may be associated with a rule e.g., such as described herein. Such processing functions may be applied according to a specific sequence e.g., a processing chain. A processing chain may be equivalent to a packet forwarding treatment. Such processing functions may be applied to data units for which the rule produced a specific outcome e.g., a positive and/or a negative match. For example, one or more rules may be associated with a processing chain applicable to data units that positively match the rule. One or more rules may correspond to a packet forwarding treatment and/or to a radio bearer. One or more of the aspects described herein may be applicable per packet forwarding treatment and/or radio bearer basis (e.g., on a per packet, per flow basis and/or per group thereof).

Such processing may be one or more of: security, Layer 3 protocols, Layer 2 protocols, Layer 2 protocol entities chain, applicable layer 1/physical layer aspects, radio link monitoring, radio link failure and re-establishment procedure, access method(s), and/or access restriction(s).

A security-based rule may be associated with a specific security context; such context may include applicable encryption and/or authentication methods (including null), keys, key derivation parameters, state (e.g., security activated or not), sequencing information and/or other related parameters. A security-based rule may be useful in case different radio bearers may be associated to different contexts entries from the perspective of the radio network (e.g., different slices may be used).

A Layer 3 protocols-based rule may be associated with applicable layer 3 (and/or above) protocol(s) and/or possibly a specific configuration thereof e.g., RRC. The rule may correspond to a signaling transport path (e.g., akin to a SRB in LTE). A rule may be useful in case different data radio bearers may be associated to different control plane contexts entries from the perspective of the radio network (e.g., different slices may be controlled separately).

A Layer 2 Protocols-based rule may be associated with applicable layer 2 protocol(s) and/or possibly a specific configuration thereof. A PDCP-based rule and/or similar may be used. The WTRU may be configured to apply a similar configuration (if any) for e.g., header compression, security, reordering, retransmissions and/or status reporting for data units associated to a specific (possibly set of) rules. A RLC-based rule and/or similar may be used. The WTRU may be configured to apply a similar configuration (if any) for e.g., RLC mode (transparent, acknowledge, unacknowledged etc.), reordering and/or in-order delivery, retransmissions and/or status reporting for data units associated to a specific (possibly set of) rules. A MAC and/or similar-based rule may be used. The WTRU may be configured to apply a similar configuration (if any) for example one or more of: buffer status reporting, scheduling request, prioritization parameters (e.g., priority level, prioritized bit rate, bucket size, etc.) for the determination of data to include in a transmission, grouping information e.g., with other rules, HARQ configuration, HARQ timing, applicable DRX configuration, applicable grants and assignments (indicated and/or implicit e.g., based on an association with a SOM and/or similar), MAC control channel (if any), PRACH resources, whether or not to generate HARQ feedback, RNTI, and/or whether or not to apply block coding (e.g., and if so, according to a specific configuration).

For example, a rule (and/or a plurality thereof) may correspond to a data transport path (e.g., akin to a DRB in LTE) or vice-versa e.g., a data transport path (e.g., a bearer) may be associated to one or more rule(s). The functions may be in a different protocol, which is not a limitation of the above. For example, a rule may be associated with a low latency service such that it matches a specific flow and/or may be associated with a specific method for scheduling request, and/or with a higher priority level, and/or with a maximum time to complete a transmission.

A Layer 2 protocol entities chain-based rule (e.g., the applicable PDCP entity, RLC entity and/or MAC instance) may be associated with applicable layer 2 protocol entities. For example, such association may be similar to the radio bearer concept in LTE. A processing chain and/or packet forwarding treatment may correspond to a radio bearer e.g., by association to a specific set of applicable layer 2 protocol entities. A rule (and/or a plurality thereof) may correspond to the entities that make a data transport path (e.g., akin to a DRB in LTE) or vice-versa e.g., the entities that make a data transport path (e.g., a bearer) may be associated to one or more rule(s). For example, a rule (and/or a plurality thereof) may be associated with a low latency service such that it matches a specific flow and/or may be associated with a specific chain of PDCP, RLC and/or MAC entities with a specific configuration and/or possibly specific low-delay processing e.g., such as a packet forwarding treatment and/or a radio bearer.

A data duplication function may be used. For example, a rule may be associated to more than one such chain e.g., to achieve data duplication for more reliable transmission. A WTRU configuration aspect may support ultra-reliable data transmissions. A WTRU may determine that a data unit (e.g., an IP packet) that matches a specific rule may be forwarded to and/or handled by a plurality of radio bearers. Such duplication may be applied at a different action/event in the chain e.g., above PDCP if duplicate data units (e.g., of an IP packet and/or of a RRC PDU) are made available for transmission to different radio bearers, under PDCP, if duplicate PDCP PDUs are made available for transmission for one or more, or each such data unit, under RLC, if duplicate RLC PDUs are sent, or the like. Different steps may represent different handling of duplicates e.g., different packet forwarding treatment may be used (possibly with different QoS characteristics), different physical layer resources may be used and/or different MAC entities may receive the data available for transmission. For example, such rule may correspond and/or be activated following detection of radio link problems for specific resources associated with the WTRU's configuration (e.g., one or more carriers, cells, control channels, MAC instances and/or the like) as a recovery procedure.

For example, a rule may be associated to one such chain but may also be associated to one additional element e.g., one additional MAC instance to enable a split transport path such that corresponding data units may have access to one or more, or multiple sets of resources, where one or more, or each may be associated to a different MAC instance (e.g., akin to controlling the applicability of split routing and/or similar to a per-flow and/or per-packet basis).

An applicable layer 1/physical layer aspects-based rule may be associated with applicable TrCH(s) and/or type thereof, cell(s), signature(s), physical layer resources, physical control channel(s), physical data channel(s), beam process(es), HARQ process identity, channel coding, physical layer configuration, SOM, numerology, applicable reference signals, TTI duration, power setting, transmission robustness, waveform, and/or the like. A rule may correspond to different types of grant and/or transmission characteristics. For example, a rule may be associated with a low latency service such that it matches a specific flow and/or may be associated with a specific TrCH (e.g., URLLCCH) corresponding to a specific control channel (e.g., PDCCH with a specific RNTI), a specific set of physical resource blocks, TTI duration of a specific duration (e.g., the shortest TTI duration applicable for the concerned configuration) and/or shortest timing for HARQ feedback. As a further example, a packet forwarding treatment (e.g., possibly a radio bearer) may be associated with a specific such layer 1/physical layer aspect(s).

Split path/bearer for multi-connectivity may be provided. For example, a rule may be associated to more than one such physical layer aspects e.g., to increase the amount of available and/or applicable resources for the corresponding data units (e.g., akin to controlling the applicability of carrier aggregation and/or similar to a per-flow basis). A physical layer aspect may be orderly arranged based on a priority. Such aspects may represent applicable type(s) of grant, TrCH and/or transmission resources where the WTRU may consider one or more, or each in decreasing priority order. The WTRU may have low latency data available for transmission in a given time period. The WTRU may determine whether or not a dedicated grant of a URLLC type of transmission is available. The WTRU may consider whether or not a URLLC type of contention-based grant is available, even if other type of resources may be available (e.g., 1 ms TTI). The WTRU may consider performing a low latency scheduling request if such is available. For data with best-effort QoS, the WTRU may consider one or more type of grants for the given time period that may otherwise be left unused.

Radio Link Monitoring may be provided. A rule-specific RLM configuration (e.g., one or more, or multiple configurations (e.g., per Uu)) may be provided. A rule may be associated with a specific procedure and/or configuration for monitoring availability of the radio link. For example, a rule associated with data units that require an ultra-reliable service may be associated with a RLM configuration that prioritize fast detection (e.g., short time before declaring RLF) above conservative triggering and/or use of recovery procedures.

A rule-specific RLM configuration may be associated to a specific recovery procedure. For example, a rule associated with data units that require an ultra-reliable service may be associated with a recovery procedure that initiates duplication of data until radio link problems are resolved. The rule may be used in combination with one or more associated physical layer aspect e.g., control channel, and/or reference signals (e.g., for measurements). The rule may be used in while it is in the active state.

A rule-specific RLM configuration may be applicable when a rule is active. A WTRU may be configured with a RLM procedure and/or its associated parameters, such that the procedure and/or the concerned parameters may be used/active (e.g., only) when a packet forwarding treatment (e.g., a radio bearer) is considered active. A packet forwarding treatment may be considered active for a specific (possibly configured) amount of time after the WTRU has last determined that new data became available for transmission for this packet forwarding treatment (and/or radio bearer). A WTRU may be configured with a value whereby the WTRU may (re-)start a timer with this value when it determines that there is new data available for transmission for the concerned packet forwarding treatment (e.g., a radio bearer). A WTRU may be configured with a value whereby the WTRU may (re-)start a timer with this value when it performs a transmission that includes data for the concerned packet forwarding treatment (e.g., a radio bearer). The WTRU may (re-)start the timer when it determines that such transmission was successful. A WTRU may be configured with a value whereby the WTRU may (re-)start a timer with this value when it determines that it has received a grant for a suitable transmission for data associated with the concerned packet forwarding treatment (e.g., a radio bearer). The WTRU may (re-)start the timer when it determines that such transmission was successful. A WTRU may be configured with a value whereby the WTRU may (re-)start a timer with this value when it performs the transmission of a signal that corresponds to a scheduling request using the method associated with the concerned packet forwarding treatment (e.g., a radio bearer).

One or more, or multiple rule-specific RLM configurations may be concurrently provided. A WTRU may be concurrently "active" with different rule-specific RLM configurations. A WTRU may ensure that RLM requirements for one or more, or all activated rules are fulfilled. A WTRU may apply the RLM configuration that represents the most stringent requirement for detection of a problem, for example, based a relative order between the RLM configurations e.g., in terms of the associated QoS profile, an identity, and/or a parameter value (e.g., a value for a configured parameter such as the number of out-of-sync detection per time period and/or the like).

For Radio Link Failure and Re-establishment procedure(s), a rule may be associated with a specific procedure and/or configuration for determination of RLF e.g., possibly based on a RLM function. For example, a rule associated with data units that may use a connection-less transfer may be associated with a recovery procedure that may initiate cell (re-)selection (and/or equivalent) and/or connection establishment and/or re-activation upon determination of RLF for the concerned rule, such that connected mode data transfer may be used instead. For example, a rule associated with data units that is associated with one or more beam process(es) may trigger a reacquisition and/or a reconfiguration of the concerned beam(s) upon determination of RLF for the concerned rule. This may occur in combination with one or more associated physical layer aspect e.g., control channel, and/or reference signals (e.g., for measurements). This may occur while a rule is in the active state. A WTRU may be configured with a RLF/Recovery procedure and/or its associated parameters such that the procedure and/or the concerned parameters may be used/active (e.g., only) when a packet forwarding treatment (e.g., a radio bearer) is considered active. The procedure/parameters may be considered active for a specific (possibly configured) amount of time after the WTRU has last determined that new data became available for transmission for this packet forwarding treatment (and/or radio bearer).

For Access method(s), a rule may be associated with applicable access method e.g., applicable control plane mode(s) (IDLE, loosely connected and/or CONNECTED mode). For example, the WTRU may determine for new data that becomes available for transmission for a data unit that matches a specific rule that the WTRU may first transit to CONNECTED mode (if not already in that mode), and/or that an access method not requiring RRC signaling e.g., a connectionless transmission may be used, and/or that a WTRU-autonomous data transmission may be initiated, and/or that a contention-based channel may be used, and/or the like. For example, the WTRU may determine for a data unit that matches a specific rule that a specific PRACH configuration may be used for accessing resources of the system.

For Access restriction(s), a rule may be associated with applicable access restrictions e.g., applicable PLMN, WTRU/subscriber class and/or the like.

More than one rule may be associated with the aspects described herein. The WTRU may use the DRX configuration associated with the active rule with the highest priority level e.g., for monitoring of control channel. This may (e.g., only) apply for a control channel (and/or other functions controlled/impacted by the power savings algorithm) associated with the concerned rule. A WTRU may be configured with a power savings algorithm (e.g., DRX) and/or its associated parameters such that the procedure and/or the concerned parameters may be used/active (e.g., only) when a packet forwarding treatment (e.g., a radio bearer) is considered active. The packet forwarding treatment may be considered active for a specific (possibly configured) amount of time after the WTRU has last determined that new data became available for transmission for this packet forwarding treatment (and/or radio bearer). A rule may correspond to a set of resources for the applicable functions, e.g., a rule may correspond to a slice.

The WTRU may be configured with such processing function(s) in association with a rule by the RRC protocol. The WTRU may be configured with such type of processing function(s) in association with a rule by the RRC protocol while the associated configuration for one or more function may be provided by MAC control e.g., for physical layer parameters. For example, the WTRU may receive a RRC configuration with a rule associated to a specific type of control channel while the WTRU may receive MAC control information that indicate the available control channel of such type.

The WTRU may be configured with a radio bearer that may be modelled by the association of one or more rules. Such modelling may further include one or more associated processing functions and/or configuration as described herein. A rule may define a logical channel. For example, data units (and/or flows) corresponding to a given rule may be associated with a LCH. A radio bearer may be associated to one or more, or multiple LCH according to such modelling; functions such as logical channel prioritization, buffer status report, scheduling request, applicable physical layer aspects (e.g., resources, control channel, TrCH etc.) may be performed per bearer.

The WTRU may be configured with a radio bearer that may be modelled by the association with a single rule (and/or a combination thereof). Such modelling may further include one or more associated processing functions and/or configuration as described herein. This may include layer 2 aspects. For example, one or more rules may define a logical channel. Data units (and/or flows) corresponding to a given rule may be associated to a LCH. The WTRU may be configured with a Logical Channel Grouping (LCG) that may include one or more LCHs. A LCG may itself be associated with one or more processing functions and/or configuration as described herein. This may include one or more of the layer 1, RLM, RLF aspects. Functions such as logical channel prioritization, buffer status report, scheduling request, applicable physical layer aspects (e.g., resources, control channel, TrCH etc.) may be performed per LCG.

A rule may be associated with a configuration for prioritization of data units by the MAC entity, e.g., upon determination of the data to include in an uplink transmission and/or e.g., upon determination whether or not to initiate a Buffer Status Reporting, a Scheduling Request, an access to the resources of the system and/or in the selection of the applicable resources.

LCP may be performed per type of physical resource for applicable bearers/logical channels. A WTRU may be configured (e.g., by RRC) with one or more applicable transport channel (TrCH) e.g., Applicable Transport Channel (appTrCH) in association with a packet forwarding treatment (e.g., a bearer, LCH and/or similar). This parameter may be in addition to legacy LTE parameters for LCP such as priority, prioritized Bit Rate (PBR), and/or bucket Size Duration (BSD).

A WTRU may be configured (e.g. by RRC) with one or more applicable physical resources, for example as indicated in grant information perhaps in association with a packet forwarding treatment (e.g. a bearer, LCH and/or similar). One or more, or a set of, applicable resources may be used for logically grouping resources for one or more TrCHs that may be associated with a appTrCH value. A TrCH can represent a transmission, perhaps for example on a (e.g., single) physical channel, and/or a (e.g., single) transport channel. There may be a distinction between one or more different transport blocks for such a channel such as indicated in grant information for the association with a packet forwarding treatment (e.g. a bearer, LCH and/or similar).

Ranking/ordering per physical resources may be provided. A priority may be further specific to one or more, or each appTrCH value. A WTRU may apply the LCP procedure when a new transmission is performed, such that the WTRU may determine the type(s) of TrCH associated with the transmission(s). A WTRU may determine the respective applicability of data associated to different LCHs with data available for transmission. For one or more, or each applicable LCH, the WTRU may determine the respective priority for the corresponding TrCH and/or data units, for example using the configuration for appTrCH and/or priority. A WTRU may allocate resources (e.g., the concerned TB(s)) based on the relative priority e.g., starting from the such determined LCH with such determined highest priority and/or further in decreasing priority order. A WTRU may allocate such resources up to a maximum amount of data. A maximum amount of data to allocate may be based on a legacy determination for the concerned LCH if PBR/BSD is applied per LCH. This may be useful to support an association between a plurality of TrCHs (and/or type thereof) and a (e.g., single) LCH (and/or equivalent) for data that may use more than one transport channel, that may have different relative priorities with respect to other LCHs with data available.

Bucket management per type of TrCH (e.g., in support for MBR in excess of GBR) may be provided. A maximum amount of data to allocate for a given period (e.g., applying legacy PBR/BSD-based determination) may be further specific to one or more, or each appTrCH value. A WTRU may perform the LCP procedure by applying PBR/BSD per LCH but also per (and/or plurality thereof) TrCH (and/or type thereof). This may be useful to support an association between a plurality of TrCHs (and/or type thereof) and a (e.g., a single) LCH (and/or equivalent) for data that may use more than one transport channel, but with different amount of prioritized serviced data per time period. LCH may be configured to operate up to the Guaranteed Bit Rate (GBR) of the corresponding service using a first TrCH with a relatively higher priority for accessing resources of the first TrCH, while it may additionally be configured to be served up to MBR using a second TrCH with a relatively low priority for accessing resources of the second TrCH.

Variable priority based on time in buffer may be provided. A WTRU may be configured to apply different priority to data available for a specific LCH as a function of head of queue delay (and/or similar determination based on time spent in the WTRU's buffer e.g., since data was first available for transmission). A WTRU may be configured with a maximum time until first transmission (and/or until successful transmission) and/or with a specific threshold adjusted to achieve some form of QoS guaranteed in terms of latency and/or the like. The WTRU may determine that if at least one data unit for a LCH associated with a (e.g., first) priority has been available for transmission such that the time left until the time limit for transmission of the data is equal or less to such threshold, the WTRU may associate a second priority (e.g., higher) to the data (and/or to the associated LCH).

A WTRU may consider the data as new data available for transmission, e.g., for further determination of whether or not further action such as a trigger for BSR, scheduling request and/or any other available techniques to acquire more resources may be initiated. A WTRU may trigger the BSR/SR if the data has a priority higher than other data already in the WTRU's buffer following the WTRU's time-based determination of the updated applicable priority. This procedure may be performed per TrCH and/or per TrCH type.

A WTRU may revert to the (e.g., first) priority level for the LCH when no data unit exceeds the time threshold following the handling of the data unit(s) that led to the change in priority handling.

Support of different TTIs may be provided. A WTRU may perform the LCP procedure when a new transmission is performed. A WTRU may apply the LCP procedure by considering such differences in numerology, such as when the WTRU is configured with physical channels characterized by different numerologies e.g., in terms of TTI duration (e.g., 1 ms vs 125 µs) and/or in terms of offset in time between the start of at least partially overlapping transmissions. A WTRU may perform the LCP procedure by considering the transmissions with the shortest TTI duration; once those resources are completely allocated, it may consider transmissions with longer TTI duration in increasing order of such duration.

Consideration of RLM may be provided. A WTRU may perform the LCP procedure with considerations for the RLM process. A WTRU may determine that a transmission that is associated with a specific TrCH that may be experiencing radio link problem(s) might not be used to serve some data units. Such may be determined based on starting a timer during which the WTRU increases supervision-related behavior (e.g., similar to timer T310 running in LTE, and/or reaching up to x consecutive out-of-sync indication from the lower layer). Data units with a priority that is equal or higher than a specific value may be used. This may be applicable (e.g., only) for data units associated to a specific (possibly configurable) LCHs and/or packet forwarding treatment. This may be applicable for semi-persistently allocated resources and/or configured grants.

A WTRU may perform duplication of data across different TrCHs (for example of possibly the same type but using different carriers, frequency, transmission methods and/or the like) to reach a certain reliability level (e.g., for a URLLC service). A WTRU may associate different priorities and/or consider different applicable TrCH for the duplicate of a given data unit that for the first instance of the data unit. A WTRU may determine to use a first set of resources, e.g., a transmission on a first carrier for a data unit while/or it may use a second set of resources e.g., a transmission on a second carrier for a duplicate of the data unit(s), perhaps for example if the WTRU is configured to transmit such duplicate(s).

Buffer status reporting and/or scheduling request may be provided. A WTRU may trigger a BSR using e.g., similar methods as for legacy LTE. Such methods may be further applied per applicable TrCH. A WTRU may be configured with different SR methods (and/or resources) to use as a function of the TrCH associated with the LCH of the data that triggered the BSR. A WTRU may determine that data that becomes available for transmission may be associated to at least one TrCH. A WTRU may determine that it may use the SR method/resources associated with such TrCH. The data may be associated to one or more, or multiple TrCHs, so the WTRU may select a single SR method/resources based on one or more aspect(s), such as shortest time to SR transmission, shortest possible time to grant, shortest combined time of time to SR transmission and shortest possible time to grant, a (possibly configured) priority, and/or a type of cell associated to the resource (e.g. PCell first, otherwise SCell).

A WTRU may determine that new data is available for transmission. For example, the WTRU may consider data as new data available for transmission based on one or more triggers/conditions associated with data to be transmitted. If a WTRU determines that new data is available for transmission, the WTRU may be configured to trigger transmission of a buffer status report (BSR) and/or a scheduling request (SR) (e.g., and/or any other available techniques to acquire/request additional resources). Examples of triggers/conditions that the WTRU may use to determine that new data is available for transmission and/or to trigger initiation of a BSR and/or SR transmission may include one or more of: a transmission property applicable to new data, a TTI duration applicable to new data, a transmission reliability required for new data, and/or a HARQ timeline/maximum latency, and/or the like. A WTRU may (e.g., also) determine an applicable transmission method for BSR and/or SR, for example based on the trigger/condition associated with the data to be transmitted.

For example, a trigger/condition that may cause the WTRU to consider new data available for transmission and/or trigger a BSR/SR may include a transmission property applicable to the new data. For example, a WTRU may determine that data is available for transmission for a bearer (and/or a service) (e.g., for a logical channel (LCH) and/or for a LCH group (LCG)) associated (e.g., configured) with a transmission property that is different than that of other data already in the buffer.

For example, a trigger/condition that may cause the WTRU to consider new data available for transmission and/or trigger a BSR/SR may include the TTI duration applicable to new data. A WTRU may determine that data is available for transmission for a bearer (and/or a service) (e.g., for a LCH and/or for a LCG) associated (e.g., configured) with a TTI duration that is different than that of other data already in the WTRU buffer. For example, the WTRU may determine new data to be transmitted is associated with a shorter TTI length than the TTI length associated with other data in the WTRU buffer. The new data being associated with a short(er) TTI length may be a trigger/condition that may cause the WTRU to consider the new data available for transmission and/or trigger a BSR/SR. For example, the WTRU may determine that data is available for a LCH (and/or a LCG) configured for transmission using a first, short, TTI duration while other data available for transmission corresponds to other LCH(s) (and/or LCGs) configured for transmission using a second, longer than the first, TTI duration. The WTRU may perform such determination irrespective of whether or not a BSR and/or a SR may be pending. A WTRU may perform such determination irrespective of whether or not a BSR and/or a SR may be pending due to data available in a LCH (and/or LCG) associated to the second (e.g., longer) TTI duration.

For example, a trigger/condition that may cause the WTRU to consider new data available for transmission and/or trigger a BSR/SR may include a transmission reliability requirement for the new data (and/or other QoS requirements associated with the data). A WTRU may determine that data is available for transmission for a bearer (and/or a service) (e.g., for a LCH and/or for a LCG) associated (e.g., configured) when the data is associated transmission reliability parameter that is not associated with other data in the WTRU buffer. Examples of transmission reliability parameters may include one or more of a maximum BLER, a PER, a guaranteed power, being associated with a specific control channel for scheduling resources, and/or the like. When the WTRU determines that new data is associated with a transmission reliability parameter that is different than that of other data already in the WTRU buffer, the new data may be consider data available for transmission and/or trigger a BSR/SR. A WTRU may perform such determination if the reliability parameter of the new data is more stringent (e.g., more reliable) than that of other data already in the WTRU buffer. For example, a WTRU may determine that data is available for a LCH (and/or a LCG) configured for transmission using a first high reliability physical data channel (e.g., corresponding to URLLC service) while other data available for transmission corresponds to other LCH(s) (and/or LCGs) configured for transmission using a second physical data channel (e.g., a PDSCH for eMBB). The WTRU may perform such determination irrespective of whether a BSR and/or a SR may be pending. The WTRU may perform such determination irrespective of whether or not a BSR and/or a SR may be pending as a BSR/SR triggered due to data available in a LCH (and/or LCG) associated to the second data channel (e.g., associated with the less stringent transmission reliability requirement).

For example, a trigger/condition that may cause the WTRU to consider new data available for transmission and/or trigger a BSR/SR may include HARQ timeline/parameter and/or a maximum latency parameter. The WTRU may determine that data is available for transmission for a bearer (and/or a service) (e.g., for a LCH and/or for a LCG) associated (e.g., configured) with a specific HARQ timeline, maximum latency, and/or maximum number of retransmissions. If the determined HARQ timeline, maximum latency, and/or maximum number of retransmissions is more stringent that than of other data already in the WTRU buffer, the WTRU may determine that the new data is available for transmission and/or may trigger a BSR and/or SR. For example, the WTRU may determine that data is available for a LCH (and/or a LCG) configured for transmission using a first short HARQ timeline and/or short maximum latency while other (previous) data available for transmission corresponds to other LCH(s) (and/or LCGs) configured for transmission using a second HARQ timeline that is longer and/or associated with greater allowable latency. The WTRU may perform such determination irrespective of whether a BSR and/or a SR may be pending. The WTRU may perform such determination irrespective of whether or not a BSR and/or a SR may be pending as a BSR/SR triggered due to data available in a LCH (and/or LCG) associated to the second HARQ timeline (e.g., the HARQ timeline with greater allowed latency).

A WTRU may determine to use of one of a plurality of available BSR and/or SR methods to apply to the concerned BSR/SR trigger. For example, the WTRU may determine with BSR/SR method to use based on which type of trigger/condition caused the WTRU to determine that the data was available for transmission and/or that the BSR/SR may be transmitted. The WTRU may initiate a first BSR and/or SR procedure for new data associated with the first transmission parameter(s) and/or a second BSR and/or SR procedure for new data associated with the second transmission parameter(s). The first transmission parameter(s) and/or second transmission parameter(s) may correspond to sets of transmission parameters. For example, a first BSR/SR method may use a first set of resources using a first numerology and/or TTI duration, and/or another method may use a second set of resources using a second numerology and/or TTI duration. A (e.g., first) BSR/SR method may be similar to a legacy LTE method (e.g., a transmission on a PUCCH resource if configured and valid and/or RA-SR otherwise using a 1 ms framing). A second BSR/SR method may use a different, shorter framing (e.g., slot-based framing and/or mini-slot framing). A second BSR/SR method may include a transmission of a BSR (and/or a similar indication of an amount of data) on a dedicated resource (e.g., such as a PUCCH resource, if configured). The second method may be used, for example when the new data is associated with more stringent QoS requirements (e.g., such as shorter allowed latency).

If duplication is active, a WTRU may consider the duplicate of the data unit as data available for transmission in the BSR calculation. A WTRU may report data amounts per TrCH/type (and/or similar). Duplication may impact the reported amount for different TrCH/type (and/or similar) for a given data unit. In view of per LCH and/or per LCG (and/or similar) reporting, the WTRU may report a certain amount of data available for transmission per TrCH/type (and/or similar). Such amount may include data subject to duplication, if applicable.

From the network perspective, given a modelling as described, the configuration associated with a radio bearer and/or LCH may implicitly enable the eNB to determine the type of physical resource/scheduling required for the data that is being reported in the BSR. Similarly, the type of SR method and/or resources used for the SR may further provide a similar information, if applicable.

User plane supporting packet/flow-based treatment may be configured via signaling.

The WTRU may be configured with one or more, or multiple (e.g., radio) interfaces. An interface may be considered as a transmission with specific characteristics. A rule such as described herein may be associated with a specific interface (e.g., a LTE access, a NR access, a Wifi access, an HSPA access, a SOM, a slice and/or the like) whereby such interface may be considered as an associated processing function. Such function may correspond to a data transfer service. For an interface, association with processing functions may be configured.

For example, the WTRU may be configured with a rule associated with a specific interface e.g., a LTE access; data units for which the outcome is positive may be handed over to the LTE component as new data available for transmission. For example, the WTRU may be configured with a rule associated with a specific interface e.g., a Wifi access; data units for which the outcome is positive may be handed over to the Wifi component as new data available for transmission. This may be useful given that different interfaces may have different characteristics in terms data transfer services being provided from the perspective of latency, RTT, set-up time, security, bandwidth, maximum bit rate etc.

More than one RAT may be able to provide data services to the WTRU simultaneously, perhaps for example using different frequency bands. For example, an application and/or service may use LTE and/or WiFi (e.g., simultaneously) on a device to carry user data to the network. While this aggregation of data services can be exploited at the application level using for example multi-flow TCP, the application layer might not be aware of the physical layer and/or radio layer constraints. The gain of using multi-flow TCP may be sensitive to the first interface selected, especially for short packets. This aggregation may be enabled at the 3GPP protocol layer.

An initial interface may be selected. The determination may be based on the service type/requirements (e.g., for short packets, and/or for services requiring low latency). Interface availability for data services may be determined. There may be multiplication of the access methods in the same spectrum (e.g., WiFi, LAA, NR-LAA) and/or application-layer multiflow operations. WTRU may route packets to an interface based on RTT, observed throughput, etc. Steady state operations may be performed with multi-flow. Interface management may be performed.

FIG. 7 shows example connection management where the applications may see one or more, or multiple interfaces: 3GPP with hidden radios (NR, LTE and/or WiFi/LAA) and/or other interfaces such as WiFi and Bluetooth. As shown, two interfaces may end-up using similar resources (e.g., in the ISM spectrum), and/or the resources from the one or more, or multiple interfaces may be jointly controlled.

The initial interface may be selected based on desirable user experience, e.g., to setup the link and/or establish the TCP window. The initial interface may be selected based on the application/traffic that is expected from the application.

The initial access RAT may be selected based on RAT status/latency of first data transmission. The initial access RAT with URLLC may be selected to open the TCP window faster and/or move and/or open other RATs. The initial access may be selected based on the application/service (e.g., based on template). The initial access may be selected based on the size of the packets.

Interface availability may be determined. Multipath-TCP might not be available when spectrum collision. The WTRU may determine when an interface is available or not based on other interface usage of radio/hardware resources.

The operator may provide QoS for the wide range of use cases expected to be fulfilled by the NextGen architecture. To provide higher level of QoS granularity, a per flow QoS concept may be used. Some QoS parameters per flow may include, but not limited to, flow identifications (packet filters, traffic templates, etc.), flow priority indicator and/or priority level, maximum bit rates, required bit rates, delay characteristics, etc.

The flow based mechanisms may be associated with a control functions in the network to setup QoS policy based on operator requirements. The QoS policy may include a list of applicable QoS per flow parameters and/or may be provided to the access network and/or to the WTRU by the control function in the network.

The access network (AN) and/or WTRU may manage QoS information on a per flow bases as in CN. The AN may perform mapping between flow marking in the core network (CN) and radio bearer concept in the radio.

The QoS framework may be based on a one-to-one association of a radio bearer to an EPS bearer. A per-flow QoS framework on the network may be used. Independent evolution of core and/or access technologies may be enabled. LTE RAN may connect to the Next Gen CN. The radio bearer concept in the in-radio access can be adapted.

QoS framework in RAN may be based on a radio bearer concept. Data from different service/flows may be associated with different treatment when transported over the air interface.

One or more of the following characteristics may be supported and/or considered for a DRB: TTI duration (one or more different TTI durations may be configured/allowed to be used based on the QoS requirements of flows); HARQ processing/timeline (different services may be associated with different HARQ processing and/or HARQ timelines); DL control channel and/or grants (different channels/regions offering different reliability levels and/or latency may be defined); WTRUs transmitting/receiving flows with varying QoS requirements may monitor different DL control channels; Data channels for UL and/or DL (different data channel processing, coding, frame structure may be defined to meet the different QoS requirement); Scheduling mechanism (allowed scheduling mechanism (e.g., scheduled, non-scheduled) may different based on services); Link monitoring and/or recovery (for example a WTRU configured with flows that require ultra-reliable services may be associated with a monitoring configuration that prioritizes fast radio link failure detection); and/or Radio access resources (different radio access resources can be associated to different DRBs/flows. Such radio access resources may include resource blocks in time and/or frequency, transmission points, carriers, PRBs, cells, and/or signatures, etc.).

To support the diverse set of requirements in NR, the radio bearer concept may enable treatment of flows with finer QoS granularity in the physical layer. To meet the requirements of the flows, the NR DRBs may support a more flexible configuration of L2 and/or L1 protocol parameters and/or procedures.

A set of rules can be defined/configured by the network for a flow. Flow(s) with matching rules can be associated to a bearer, which may include a configuration of a set of layer 2 protocol parameters/functions and/or layer 1 configuration parameters/functions/procedures.

NR DRB may be defined as a configuration of one or more QoS matching rules associated with a set of Layer 2 protocol parameters/functions and/or L1/PHY characteristics/configuration.

The configuration associated with a bearer and/or flow to bearer mapping can be under the control of the access network. The network can configure the WTRU with the associated rules and/or with the associated bearer configuration. In D2D communication, the WTRU can dynamically set up the PDCP/RLC entity upon reception of packets from higher layers tagged with a certain priority. For WTRU-to-network communication, WTRU may dynamically create "bearers" based on the type of bearer configuration across L1/L2. The WTRU may notify the network that it has created bearer (e.g., to enable the network to perform proper prioritization and/or scheduling).

The radio bearer configuration and/or matching rules may be controlled by the access network. A set of physical layer 1 characteristics may be configured and/or associated to a bearer. Some of the physical layer configurations associated to a radio bearer can include one or more of: TTI duration(s), HARQ timelines, physical channels configuration/processing, frame structure, and/or resource allocation(s).

A radio bearer can be configured with associated physical layer parameters such as TTI duration, HARQ timeline, physical channel configuration/processing, radio resources. Additional physical layer parameters can be used.

A DRB can be associated and/or configured with different protocol termination points and/or different protocol split(s). DRBs of the same WTRU can have different protocol termination points/depending on services. DRBs of the same WTRU can be configured with different access resources, including cells, carriers, transmission points, and/or physical resources that can be used within a "cell", and/or access RAT. For example, if the WTRU is configured with eMBB and/or low latency, it is possible that the DRB associated with the high bit rate services may be mapped to one or more, or several, carriers in higher frequencies (e.g., carrier aggregation in high frequencies). A DRB associated with URLLC flow may be configured to a carrier of lower frequency, perhaps for example offering better coverage and/or reliability.

Figure 9:
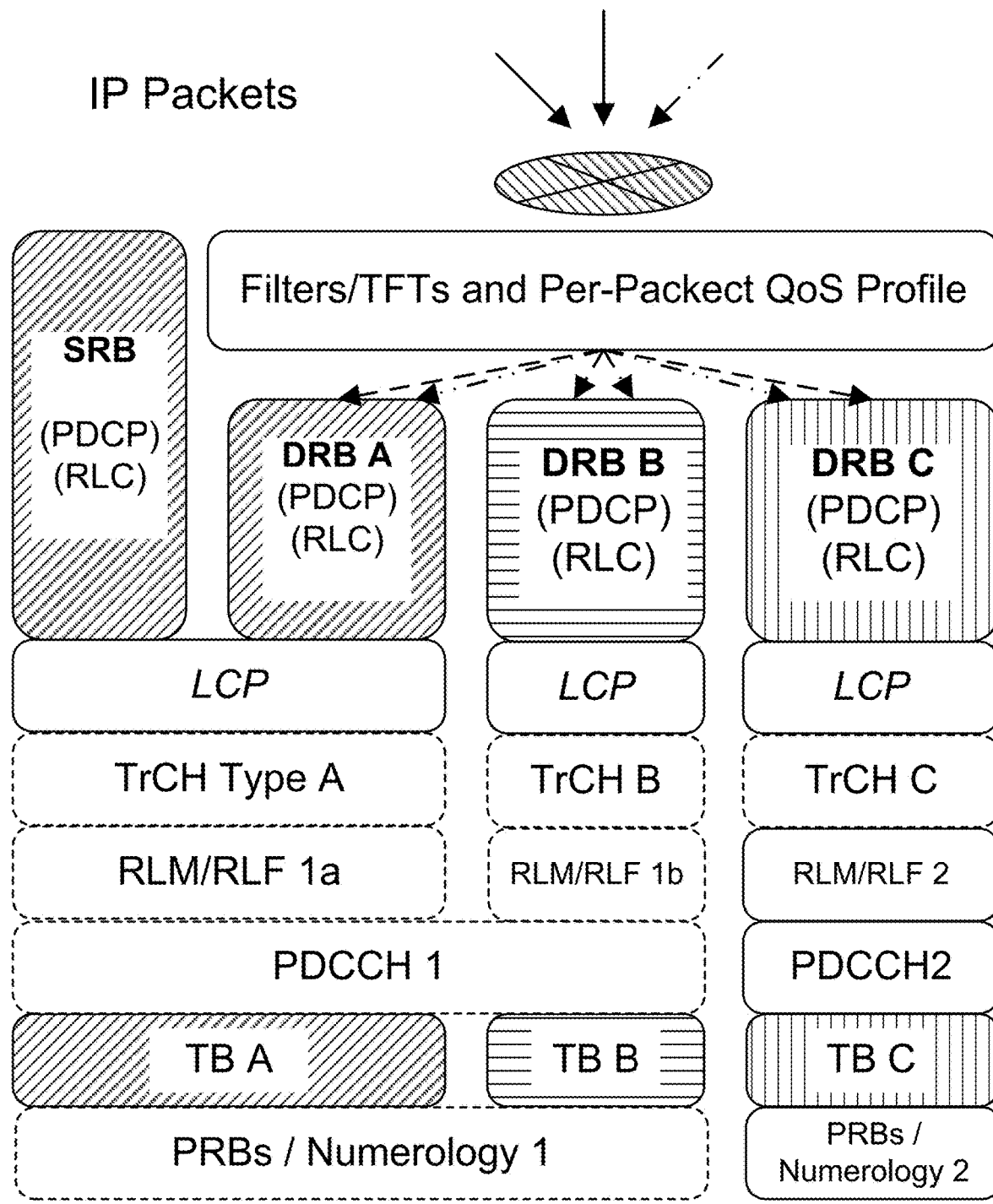
FIG. 9 illustrates an example architecture.

DRBs of the same WTRU can be configured with different access resources (e.g., cells, carriers, transmission points, beams, physical resources, RAT). FIG. 9 illustrates an example architecture according to the one or more example techniques and/or devices described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

What is claimed is:

1. A method implemented by wireless transmit/receive unit (WTRU), the method comprising:
generating (1) a first data unit including first data and a first QoS flow indicator and (2) a second data unit including second data and a second QoS flow indicator, wherein the first data and the first QoS flow indicator are associated with a first data flow, and wherein the second data and the second QoS flow indicator are associated with a second data flow;
determining, based on one or more mapping rules, that the first data unit and the second data unit are associated with a data radio bearer;
generating a transport block that includes: (1) the first data unit including the first QoS flow indicator and (2) the second data unit including the second QoS flow indicator; and
sendinga data transmission including the transport block.

2. The method of claim 1, wherein the first and second data units are layer 2 data units.

3. The method of claim 1, wherein the generating of the first and second data units includes generating a first layer 2 header of the first data unit including the first QoS flow indicator and a second layer 2 header of the second data unit including the second QoS flow indicator.

4. The method of claim 1, wherein a value of the first QoS flow indicator indicates a first guaranteed flow bitrate or a first maximum flow bitrate associated with the first data flow and a value of the second QoS indicator indicates a second, different guaranteed flow bitrate or a second, different maximum flow bitrate associated with the second data flow.

5. The method of claim 1, wherein the data radio bearer is associated with a plurality of data flows having respectively different values of QoS flow indicators.

6. The method of claim 1, wherein the data radio bearer is a New Radio (NR) data radio bearer.

7. The method of claim 1, further comprising determining, based on a plurality of QoS flow indicators including at least the first and second QoS flow indicators of first and second data units of the transport block, any of: (1) one or more physical resources, (2) one or more cells, (3) one or more carriers, (4) one or more transmission points, or (5) one or more Radio Access Technologies (RATs) to be used for sending the transport block.

8. The method of claim 1, wherein the first data unit is associated with an Ultra Reliable Low Latency (URLLC) service and the second data unit is associated with an enhanced Mobile Broadband (eMBB) service.

9. The method of claim 1, further comprising receiving configuration information including data radio bearer information associated with the data radio bearer and Quality of Service (QoS) flow information associated with the first data flow and the second data flow.

10. The method of claim 1, further comprising receiving a third data unit associated with the first data flow and a fourth data unit associated with the second data flow.

11. The method of claim 1, further comprising:
mapping the first data unit to the data radio bearer based on the first QoS flow indicator; and
mapping the second data unit to the data radio bearer based on the second QoS flow indicator.

12. The method of claim 1, wherein the generating comprises generating the transport block based on the determining that the first data unit and the second data unit are associated with the data radio bearer.

13. A wireless transmit/receive unit (WTRU), comprising:
a transmitter/receiver unit; and
a processor configured to:
generate (1) a first data unit including first data and a first QoS flow indicator and (2) a second data unit including second data and a second QoS flow indicator, wherein the first data and the first QoS flow indicator are associated with a first data flow, and wherein the second data and the second QoS flow indicator are associated with a second data flow,
determine, based on one or more mapping rules, that the first data unit and the second data unit are associated with a data radio bearer, and
generate a transport block that includes: (1) the first data unit including the first QoS flow indicator and (2) the second data unit including a second QoS flow indicator,
wherein the transmitter/receiver unit is configured to send a data transmission including the transport block.

14. The WTRU of claim 11, wherein the first and second data units are layer 2 data units.

15. The WTRU of claim 11, wherein the processor is configured to generate a first layer 2 header of the first data unit including the first QoS flow indicator and a layer 2 header of the second data unit including the second QoS flow indicator.

16. The WTRU of claim 13, wherein a value of the first QoS flow indicator indicates a first guaranteed flow bitrate or a first maximum flow bitrate associated with the first data flow and a value of the second QoS indicator indicates a second, different guaranteed flow bitrate or a second, different maximum flow bitrate associated with the second data flow.

17. The WTRU of claim 11, wherein the processor is configured to establish the data radio bear that is associated with a plurality of data flows having respectively different values of QoS flow indicators.

18. The WTRU of claim 11, wherein the processor is configured to establish a New Radio (NR) data radio bearer, as the data radio bearer.

19. The WTRU of claim 11, wherein the processor is configured to determine, based on a plurality of QoS flow indicators including at least the first and second QoS flow indicators of first and second data units of the transport block, any of: (1) one or more physical resources, (2) one or more cells, (3) one or more carriers, (4) one or more transmission points, or (5) one or more Radio Access Technologies (RATs) to be used to send the transport block.

20. The WTRU of claim 11, wherein the first data unit is associated with an Ultra Reliable Low Latency (URLLC) service and the second data unit is associated with an enhanced Mobile Broadband (eMBB) service.

21. The WTRU of claim 13, wherein the transmitter/receiver unit is configured to receive configuration information including data radio bearer information associated with the data radio bearer and Quality of Service (QoS) flow information associated with the first data flow and the second data flow.

22. The WTRU of claim 13, wherein the transmitter/receiver unit is configured to receive a third data unit associated with the first data flow and a fourth data unit associated with the second data flow.

23. The WTRU of claim 13, wherein the processor is configured to:
map the first data unit to the data radio bearer based on the first QoS flow indicator; and
map the second data unit to the data radio bearer based on the second QoS flow indicator.

24. The WTRU of claim 13, wherein the transport block is generated based on the determination that the first data unit and the second data unit are associated with the data radio bearer.

* * * * *

UNITED STATES PATENT AND TRADEMARK OFFICE
CERTIFICATE OF CORRECTION

PATENT NO. : 11,678,321 B2
APPLICATION NO. : 17/092407
DATED : June 13, 2023
INVENTOR(S) : Ghyslain Pelletier, Diana Pani and Benoit Pelletier It is certified that error appears in the above-identified patent and that said Letters Patent is hereby corrected as shown below:

In the Claims

At Column 37, Lines 25-26: replace "a second QoS flow indicator," with --the second QoS flow indicator,--
At Column 37, Line 30: replace "claim 11" with --claim 13--
At Column 37, Line 32: replace "claim 11" with --claim 13--
At Column 38, Line 1: replace "claim 11" with --claim 13--
At Column 38, Line 5: replace "claim 11" with --claim 13--
At Column 38, Line 8: replace "claim 11" with --claim 13--
At Column 38, Line 17: replace "claim 11" with --claim 13--

Signed and Sealed this
Twenty-sixth Day of March, 2024

Katherine Kelly Vidal
*Director of the United States Patent and Trademark Office*